(12) United States Patent
Hatano et al.

(10) Patent No.: US 7,586,827 B2
(45) Date of Patent: Sep. 8, 2009

(54) OPTICAL PICKUP APPARATUS

(75) Inventors: Takuji Hatano, Suita (JP); Katsuya Yagi, Hino (JP); Yuichi Atarashi, Hachioji (JP); Yuichiro Ori, Moriyama (JP)

(73) Assignee: Konica Minolta Opto, Inc., Hachioji-shi (JP)

(*) Notice: Subject to any disclaimer, the term of this patent is extended or adjusted under 35 U.S.C. 154(b) by 677 days.

(21) Appl. No.: 10/972,970

(22) Filed: Oct. 25, 2004

(65) Prior Publication Data

US 2005/0111337 A1 May 26, 2005

(30) Foreign Application Priority Data

Oct. 27, 2003 (JP) ............................. 2003-366377

(51) Int. Cl.
*G11B 7/12* (2006.01)
(52) U.S. Cl. ............... 369/112.16; 369/112.21; 369/112.22; 369/44.23
(58) Field of Classification Search ........... 369/112.26, 369/112.16, 47.5, 112.01, 112.22, 112.24, 369/112.21, 44.23
See application file for complete search history.

(56) References Cited

U.S. PATENT DOCUMENTS

| | | | | |
|---|---|---|---|---|
| 5,883,741 A * | 3/1999 | Ono et al. | ................ | 359/495 |
| 6,084,843 A * | 7/2000 | Abe et al. | ............... | 369/112.07 |
| 6,091,691 A * | 7/2000 | Yoo et al. | ............... | 369/112.11 |
| 6,091,692 A * | 7/2000 | Morimoto | ............... | 369/112.17 |
| 6,195,315 B1 * | 2/2001 | Takahashi et al. | ......... | 369/44.23 |
| 6,819,646 B1 * | 11/2004 | Kitaoka et al. | .......... | 369/112.01 |
| 2001/0048654 A1 | 12/2001 | Miura et al. | ............ | 369/112.19 |
| 2002/0181366 A1 * | 12/2002 | Katayama | .................. | 369/53.2 |
| 2003/0053397 A1 | 3/2003 | Katayama et al. | ....... | 369/112.17 |
| 2003/0185134 A1 * | 10/2003 | Kimura et al. | .......... | 369/112.08 |
| 2003/0227858 A1 * | 12/2003 | Komma | .................. | 369/112.08 |
| 2004/0032815 A1 * | 2/2004 | Kim et al. | .............. | 369/112.26 |
| 2004/0156302 A1 * | 8/2004 | Nakata et al. | ........... | 369/112.17 |
| 2004/0233827 A1 * | 11/2004 | Yi et al. | ....................... | 369/121 |

FOREIGN PATENT DOCUMENTS

| | | |
|---|---|---|
| JP | 2000-268397 A | 9/2000 |
| JP | 2000-276766 A | 10/2000 |
| JP | 2004-103145 A | 4/2004 |

* cited by examiner

*Primary Examiner*—Thang V Tran
*Assistant Examiner*—Thomas D Alunkal
(74) *Attorney, Agent, or Firm*—Sidley Austin LLP

(57) ABSTRACT

An optical pickup apparatus has a semiconductor laser source which emits a laser beam in a wavelength band of 405 nm having an elliptic light intensity distribution; a beam shaping element which shapes the light intensity distribution of the laser beam; a polarizing beam splitter having a polarized light separation film in contact with the air and reflecting the laser beam shaped by the beam shaping element on the polarized light separation film; and an objective lens which focuses the laser beam reflected on the polarized light separation film onto an optical information recording medium.

27 Claims, 13 Drawing Sheets

OPTICAL PICKUP APPARATUS

This application is based on the application No. 2003-366377 filed in Japan Oct. 27, 2003, the entire content of which is hereby incorporated by reference.

BACKGROUND OF THE INVENTION

1. Field of the Invention

The present invention relates to an optical pickup apparatus, and more in particular to an optical pickup apparatus capable of recording and reproducing optical information on and from high-density optical information recording media using at least a blue-violet laser beam.

2. Description of the Related Art

In recent years, vigorous efforts have been made to develop high-density optical information recording media (hereinafter referred to as "the high-density media") using a blue-violet laser beam having a wavelength of about 405 nm and an optical disk apparatus for recording and reproducing an image on and from the high-density media. The satisfactory recording/reproduction in and from the high-density media requires an optical pickup apparatus of high accuracy. Also, an optical disk for high-density media is desirably compatible with existing optical information recording media such as a CD (compact disk) and a DVD (digital versatile disk). In any case, an attempt to use the high-density media with a configuration of a conventional optical pickup apparatus unavoidably increases the size and cost of the optical pickup apparatus. A light path branch configuration of a laser beam is one of the contributing factors.

The conventionally known optical pickup apparatuses compatible with DVD and CD uses a beam splitter for branching the light path to lead the laser beam from a semiconductor laser source to an optical information recording medium and the return light to a photodetector. The known beam splitters for branching the light path include a polarizing beam splitter of glass cube type (disclosed in United States Patent Application Publication No. 2003/0053397A1, for example) and a beam splitter of plane-parallel plate type (disclosed in United States Patent Application Publication No. 2001/0048654A1, for example).

The polarizing beam splitter of glass cube type described in United States Patent Application Publication No. 2003/0053397A1 has such a configuration that two glass prisms are attached to each other through a polarized light separation film. The complicated structure with the attached surfaces and a great number of required component elements increases the cost and reduces the layout freedom, thereby complicating the optical configuration. As a result, the optical pickup apparatus and the optical disk apparatus on which the optical pickup apparatus is mounted cannot be easily reduced in weight, thickness, size and cost.

The beam splitter of plane-parallel plate type described in United States Patent Application Publication No. 2001/0048654A1, on the other hand, has a half-mirror function not dependent on polarization on both sides of the plane-parallel plate and splits the incident laser beam into transmitted light and reflected light. This beam splitter, smaller in the number of component elements without any attached surfaces, has a simple optical structure for branching the light path and a higher freedom of optical layout. This is advantageous for reducing the weight, thickness, size and cost of the optical pickup apparatus. The branching of the light path without depending on the polarization, however, unavoidably reduces the light utilization rate. With the semiconductor laser of red and infrared light having a strong laser power, the reduced light utilization rate of the beam splitter poses no serious problem. In the blue-violet semiconductor laser weak in laser power, however, the reduced light utilization rate of the beam splitter makes it impossible for the luminous energy of the laser beam to meet the performance requirement of the photodetector. In the configuration of the conventional optical pickup apparatus which branches the light path with a beam splitter using no polarization, therefore, it is difficult to use the high-density media using the blue-violet laser.

SUMMARY OF THE INVENTION

The object of this invention is to solve the problems described above, and specifically to provide a compact, inexpensive optical pickup apparatus simple in configuration which is adapted for the high-density media using the blue-violet laser.

In order to achieve this object, according to a first aspect of the invention, there is provided an optical pickup apparatus comprising: a semiconductor laser source which emits a laser beam in a wavelength band of 405 nm (=405±10 nm in wavelength) having an elliptic light intensity distribution; a beam shaping element which shapes the light intensity distribution of the laser beam emitted from the semiconductor laser source; a polarizing beam splitter having a polarized light separation film in contact with the air, the polarizing beam splitter reflecting the laser beam shaped by the beam shaping element on the polarized light separation film; and an objective lens which focuses the laser beam reflected on the polarized light separation film onto an optical information recording medium.

According to a second aspect of the invention, there is provided an optical pickup apparatus comprising: a first semiconductor laser source which emits a first laser beam in a wavelength band of 405 nm (=405±10 nm in wavelength) having an elliptic light intensity distribution; a second semiconductor laser source which emits a second laser beam in a wavelength band of 650 nm (=650±20 nm in wavelength); a beam shaping element which shapes the light intensity distribution of the first laser beam emitted from the first semiconductor laser source; a light path combiner which combines a light path of the first laser beam shaped by the beam shaping element and a light path of the second laser beam emitted from the second semiconductor laser source; a polarizing beam splitter having a polarized light separation film in contact with the air, the polarizing beam splitter reflecting the first and second laser beams having a combined light path combined by the light path combiner on the polarized light separation film; and an objective lens which focuses the first and second laser beams reflected on the polarized light separation film, onto an optical information recording medium.

According to a third aspect of the invention, there is provided an optical pickup apparatus comprising: a first semiconductor laser source which emits a first laser beam in a wavelength band of 405 nm (=405±10 nm in wavelength) having an elliptic light intensity distribution; a second semiconductor laser source which emits a second laser beam in a wavelength band of 650 nm (=650±20 nm in wavelength); a third semiconductor laser source which emits a third laser beam in a wavelength band of 780 nm (=780±20 nm in wavelength), the third semiconductor laser source being located in proximity to the second semiconductor laser source; a beam shaping element which shapes the light intensity distribution of the first laser beam; a light path combiner which combines a light path of the first laser beam shaped by the beam shaping element and light paths of the second and third laser beams respectively emitted from the second and third semiconductor laser source; a polarizing beam splitter having a polarized light separation film in contact with the air, the polarizing beam splitter reflecting the first, second and third laser beams having a combined light path combined by the light path combiner on the polarized light separation film; and an objective lens which focuses the first, second and third laser beams reflected on the polarized light separation film, onto an optical information recording medium.

In the first to third aspects of the invention, the laser beam in the wavelength band of 405 nm diverging with the elliptic light intensity distribution is shaped by the beam shaping element, and therefore the light path can be branched with the optimum polarized light separation characteristic adapted to the incidence angle dependence of the polarizing beam splitter. Further, in view of the fact that the shaped laser beam is reflected on the polarized light separation film in contact with the air by the polarizing beam splitter, the optical configuration for branching the light path is simplified while at the same time improving the optical layout freedom. As a result, the optical pickup apparatus can be easily reduced in weight, thickness, size and cost. Thus, the invention is applicable to the high-density media using the blue-violet laser, and can realize an optical pickup apparatus that can be easily reduced in size and cost with a simple configuration.

Further, the optical pickup apparatus according to the second aspect of the invention is adapted for the optical information recording media using the laser beam in the wavelength bands of 405 nm and 650 nm, while the optical pickup apparatus according to the third aspect of the invention is adapted for the optical information recording media using the laser beam in the wavelength bands of 405 nm, 650 nm and 780 nm.

BRIEF DESCRIPTION OF THE DRAWINGS

These and other objects, advantages and features of the invention will become apparent from the following description thereof taken in conjunction with the preferred embodiments with reference to the accompanying drawings in which.

DESCRIPTION OF THE PREFERRED EMBODIMENTS

Figure 1:
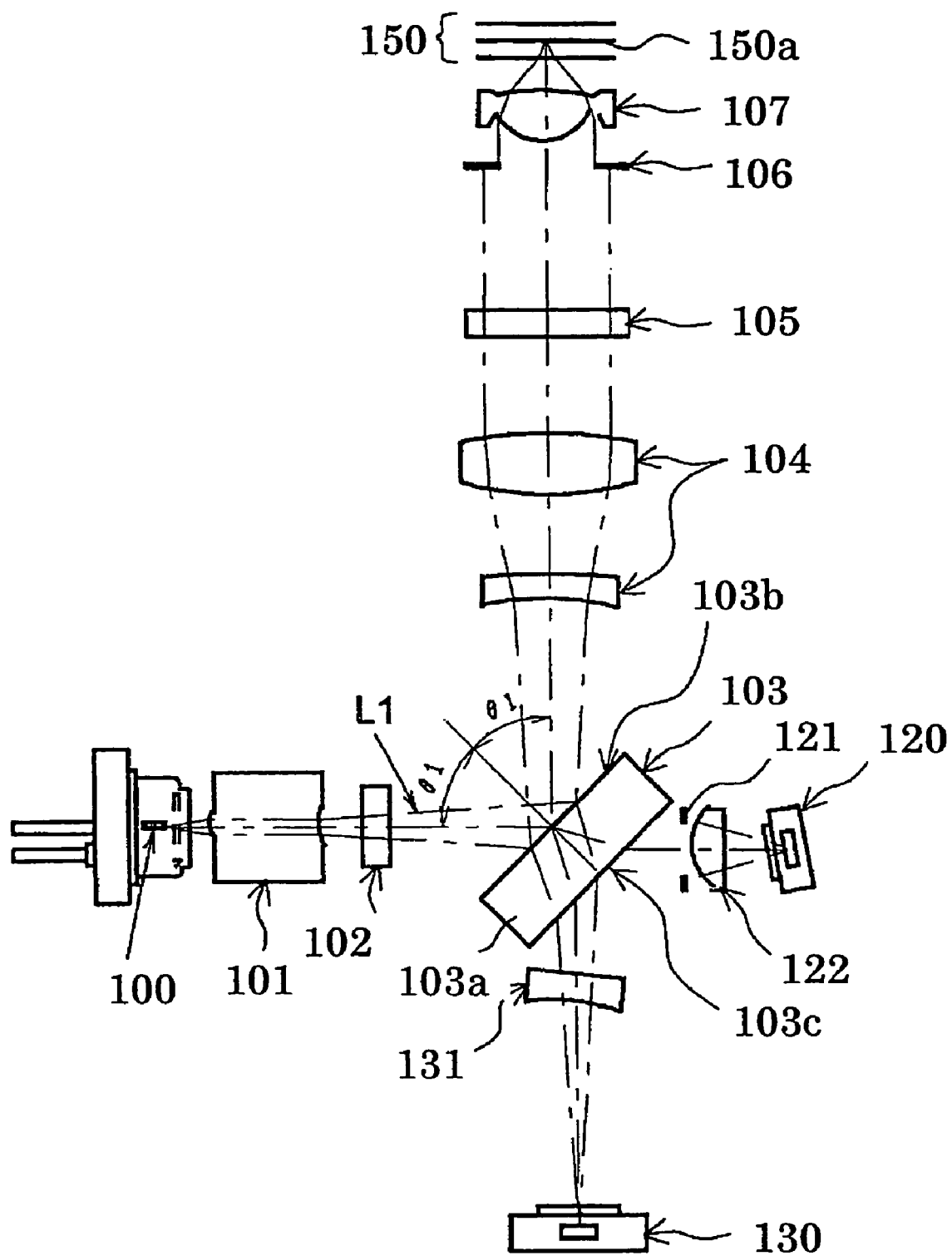
FIG. 1 is a diagram showing an optical configuration of an optical pickup apparatus according to a first embodiment of the invention.

An optical pickup apparatus according to this invention is explained below with reference to the drawings. In the drawings, similar or identical component parts are may not be described again.

First Embodiment 1-wavelength Type

FIG. 1 shows an optical configuration of an optical pickup apparatus according to a first embodiment of the invention. This optical pickup apparatus is of one-wavelength type capable of recording and reproducing the optical information on a high-density medium (corresponding to the optical disk 150 in FIG. 1) using the blue-violet laser. The apparatus has a blue laser source 100 as a semiconductor laser source for emitting a laser beam L1 in the wavelength band of 405 nm (=405±10 nm in wavelength). The laser beam L1 emitted from the blue laser source 100 is a divergent bundle of rays having an elliptic light intensity distribution. The divergence angle θ∥ in the direction parallel to an active layer of the blue laser source 100 is along the short axis of the ellipse, and the divergence angle θ⊥ in the direction perpendicular to the active layer of the blue laser source 100 is along the long axis of the ellipse (θ∥<θ⊥). According to this embodiment, both the divergence angle θ∥ of 9° and θ⊥ of 23° a full angle at half maximum. In the arrangement of the blue laser source 100 shown in FIG. 1, the divergence angle θ⊥ is parallel to the page and the divergence angle θ∥ is perpendicular to the page. The laser beam L1 is polarized linearly with the electrical vector thereof in the direction parallel to the active layer of the blue laser source 100.

The laser beam L1 emitted from the blue laser source 100 in such a manner as to diverge with an elliptic light intensity distribution is shaped by a beam shaping element 101 to the form of a light intensity distribution desirable for the recording/reproduction characteristics. In a desirable light intensity distribution, the peripheral intensity ratio (rim intensity) of the bundle of rays incident to an objective lens 107 (described later) is, for example, 65% (radially of the disk) and 60% (tangentially of the disk). For assigning the divergence angle θ⊥ of 23° to the rim intensity of 65% radially of the disk), 0.155 of NA (numerical aperture) of the laser beam L1 is led to the aperture stop 106 of the objective lens 107. For assigning the divergence angle θ∥ of 9° to the rim intensity of 60% (tangentially of the disk), on the other hand, 0.067 of the NA of the laser beam L1 is led to the aperture stop 106 of the objective lens 107. According to this embodiment, the desired rim intensity is secured by setting the shaping magnification of the beam shaping element 101 in the direction of the divergence angle θ⊥ to 0.43 and no-coversion in the direction of the divergence angle θ∥.

The laser beam L1 shaped by the beam shaping element 101, which enters a diffraction grating 102 for tracking by the DPP (differential push-pull) method or the 3-beam method, is split into a main beam (0-order light) for recording and reproduction on and from the optical disk 150 and two sub-beams (±1-order light, not shown in FIG. 1) for detecting a tracking error. The laser beam (main beam) L1 emitted from the diffraction grating 102 enters the polarizing beam splitter 103 of plane-parallel plate type. In the process, the incidence angle of the laser beam L1 to the polarized light separation film 103b is 45°, and the angular range (aperture angle) α1 is 4°. The polarizing beam splitter 103 is configured of a transparent plane-parallel plate 103a constituting a base board, a polarized light separation film 103b including a multilayer optical thin film (or a multilayer optical thin film covered by a protective film) on one surface of the plane-parallel plate 103a, an anti-reflection film 103c including a multilayer optical thin film (or a multilayer optical thin film covered by a protective film) on the other surface of the plane-parallel plate 103a. The polarized light separation film 103b has such a polarized light separation characteristic that substantially all the s-polarized light component of the incident bundle of rays is reflected and substantially all the p-polarized light component is transmitted. The laser beam L1 is s-polarized with respect to the polarized light separation film 103b. Thus, the laser beam L1 is reflected for the most part on the polarized light separation film 103b in contact with the air.

Figure 2A:
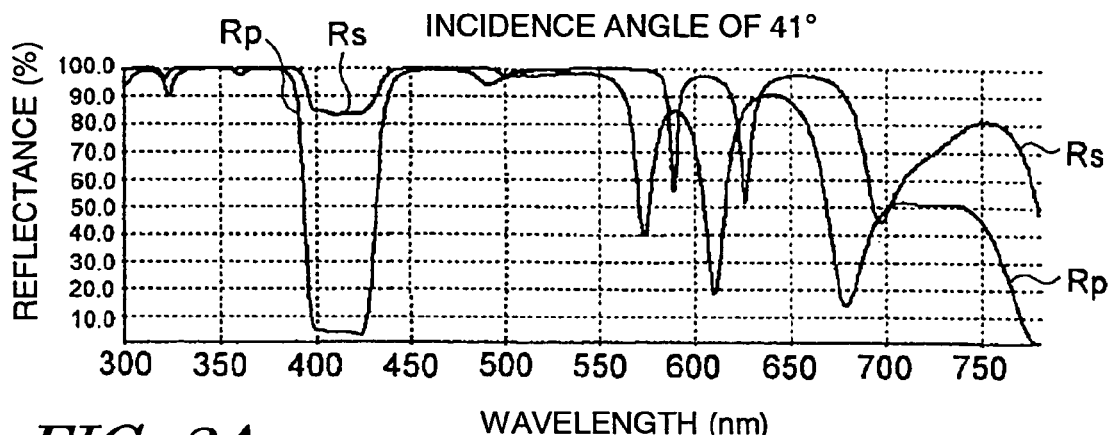
FIG. 2A is a graph showing the reflectivity representing the polarized light separation characteristic of the polarized light separation film used with the wavelength band of 405 nm and the incidence angle of 41°.
Figure 2B:
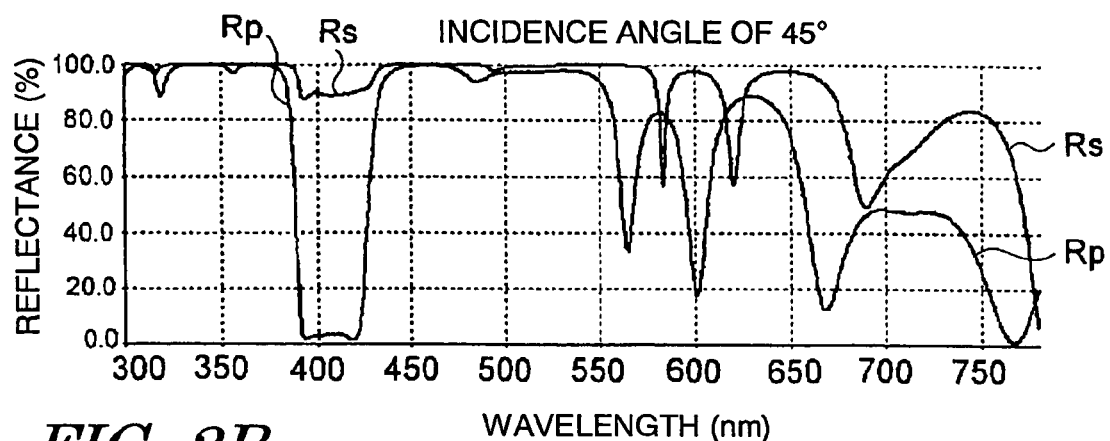
FIG. 2B is a graph showing the reflectivity representing the polarized light separation characteristic of the polarized light separation film used with the wavelength band of 405 nm and the incidence angle of 45°.
Figure 2C:
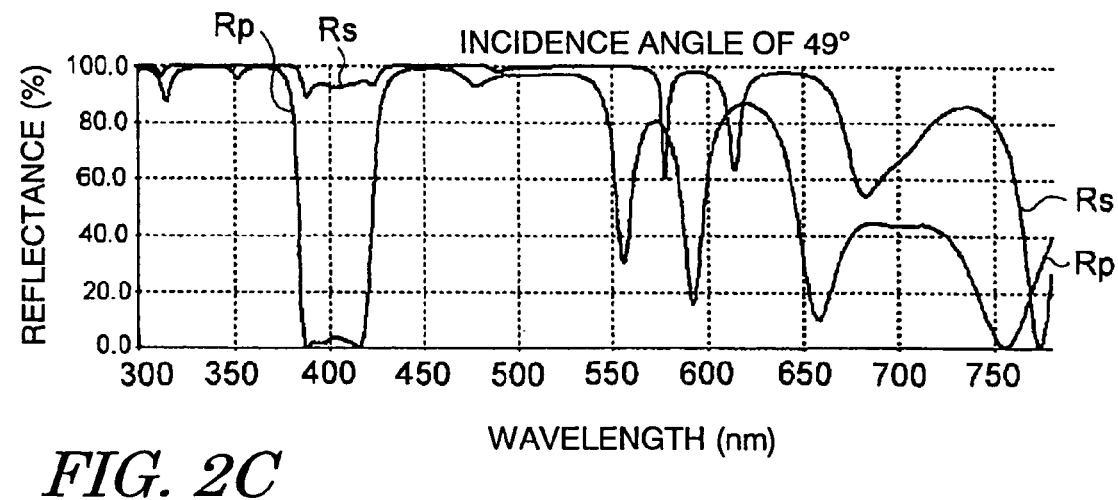
FIG. 2C is a graph showing the reflectivity representing the polarized light separation characteristic of the polarized light separation film used with the wavelength band of 405 nm and the incidence angle of 49°.

In FIGS. 2A to 2C, the polarized light separation characteristic of the polarized light separation film 103b used at the incidence angle of 45±4° (41° in FIG. 2A, 45° in FIG. 2B and 49° in FIG. 2C) with respect to the film surface in the wavelength band of 405 nm is shown in terms of reflectivity in % (Rs: reflectivity of s-polarized light, Rp: reflectivity of p-polarized light). The polarized light separation film 103b having this polarized light separation characteristic is optimized for the first embodiment, and in the practical range of wavelength of 400 nm to 415 nm and incidence angle of 45±4°, the characteristic sufficient for practical purposes, i.e. the transmittance Tp of more than 95% for the p-polarized light and the reflectivity Rs of 88±5% for s-polarized light is obtained.

Figure 3A:
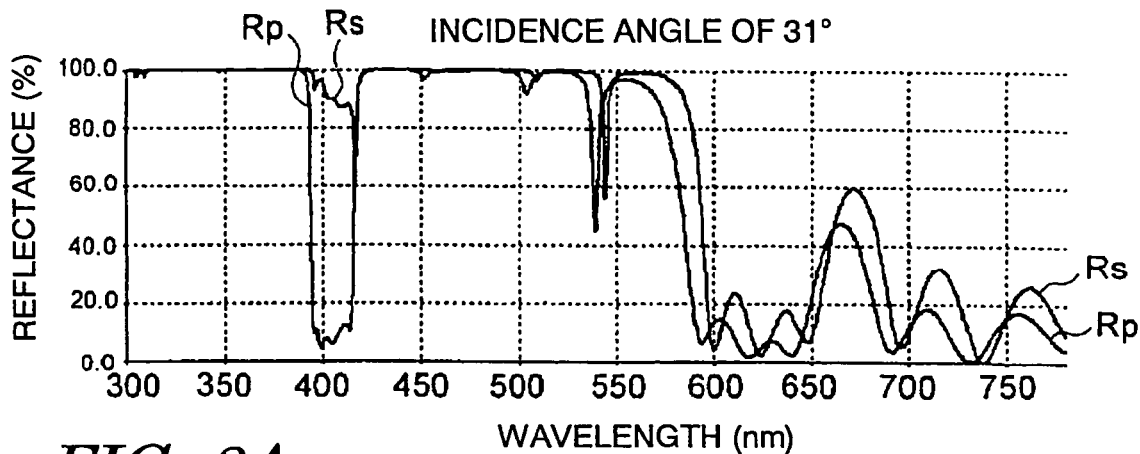
FIG. 3A is a graph showing the reflectivity representing the polarized light separation characteristic of the polarized light separation film used with the wavelength band of 405 nm and the incidence angle of 31°.
Figure 3B:
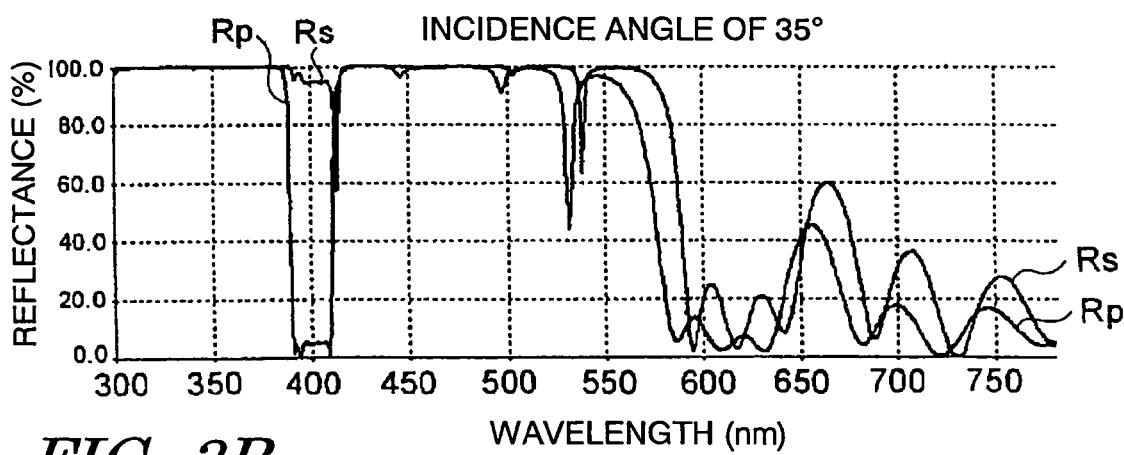
FIG. 3B is a graph showing the reflectivity representing the polarized light separation characteristic of the polarized light separation film used with the wavelength band of 405 nm and the incidence angle of 35°.
Figure 3C:
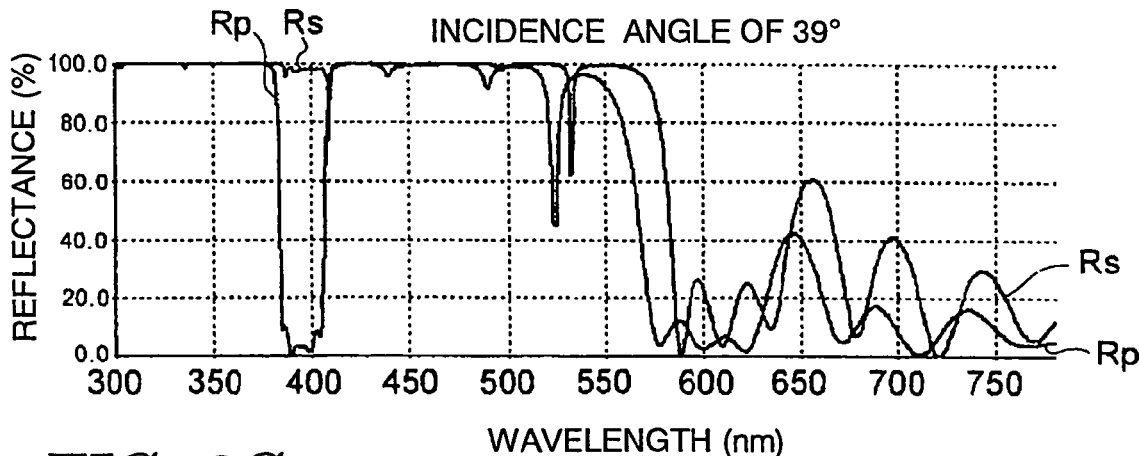
FIG. 3C is a graph showing the reflectivity representing the polarized light separation characteristic of the polarized light separation film used with the wavelength band of 405 nm and the incidence angle of 39°.

In FIGS. 3A to 3C, the polarized light separation characteristic of the polarized light separation film 103b used at the incidence angle of 35±4° (31° in FIG. 3A, 35° in FIG. 3B and 39° in FIG. 3C) with respect to the film surface in the wavelength band of 405 nm is shown in terms of reflectivity in % (Rs: reflectivity of s-polarized light, Rp: reflectivity of p-polarized light). The polarized light separation film 103b having this polarized light separation characteristic is optimized by changing the arrangement of the polarizing beam splitter 103 from that in the first embodiment, and in the practical wavelength range of 400 nm to 415 nm and incidence angle of 35±4°, the characteristic sufficient for practical purposes, i.e. the transmittance Tp of more than 90% for p-polarized light and the reflectivity Rs of 94±5% for s-polarized light is obtained. By setting the incidence angle θ1 of the laser beam L1 to 35° in this way, the width of the apparatus as a whole can be reduced below the width for the case of θ1=45° due to the freedom of optical arrangement.

Figure 4A:
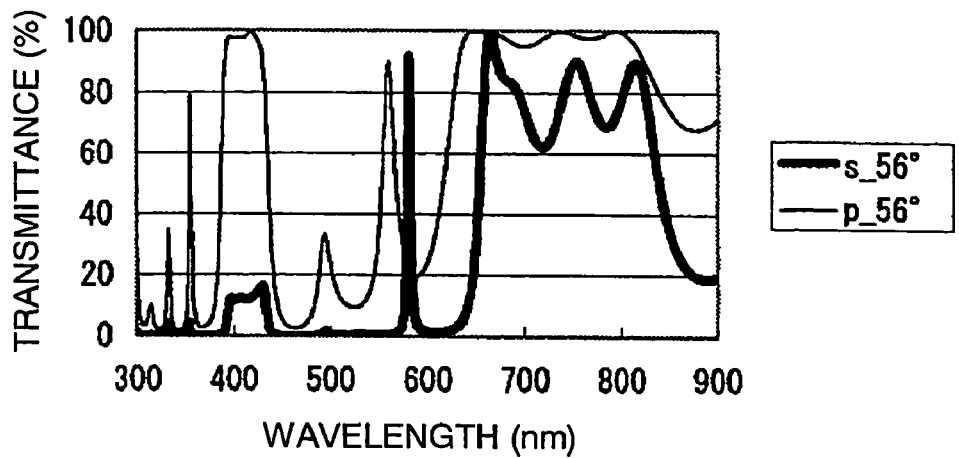
FIG. 4A is a graph showing the transmittance representing the polarized light separation characteristic of the polarized light separation film used with the wavelength band of 405 nm and the incidence angle of 56°.
Figure 4B:
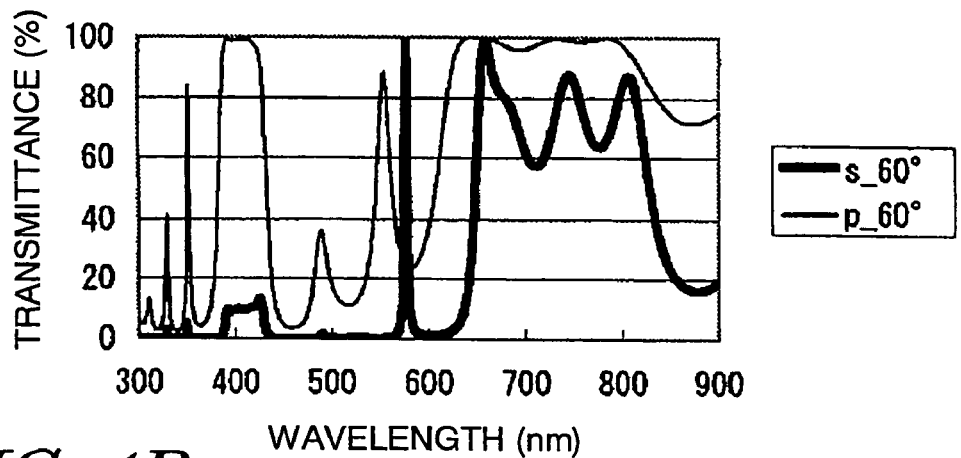
FIG. 4B is a graph showing the transmittance representing the polarized light separation characteristic of the polarized light separation film used with the wavelength band of 405 nm and the incidence angle of 60°.
Figure 4C:
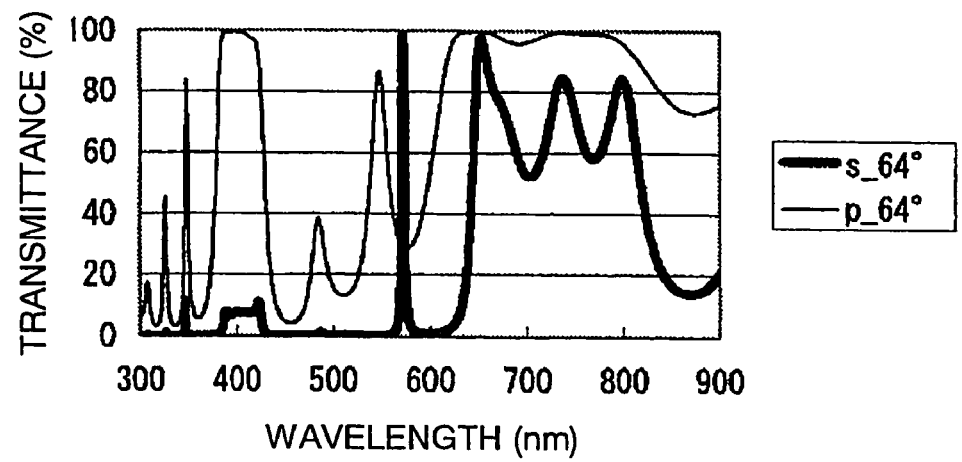
FIG. 4C is a graph showing the transmittance representing the polarized light separation characteristic of the polarized light separation film used with the wavelength band of 405 nm and the incidence angle of 64°.
Figure 5:
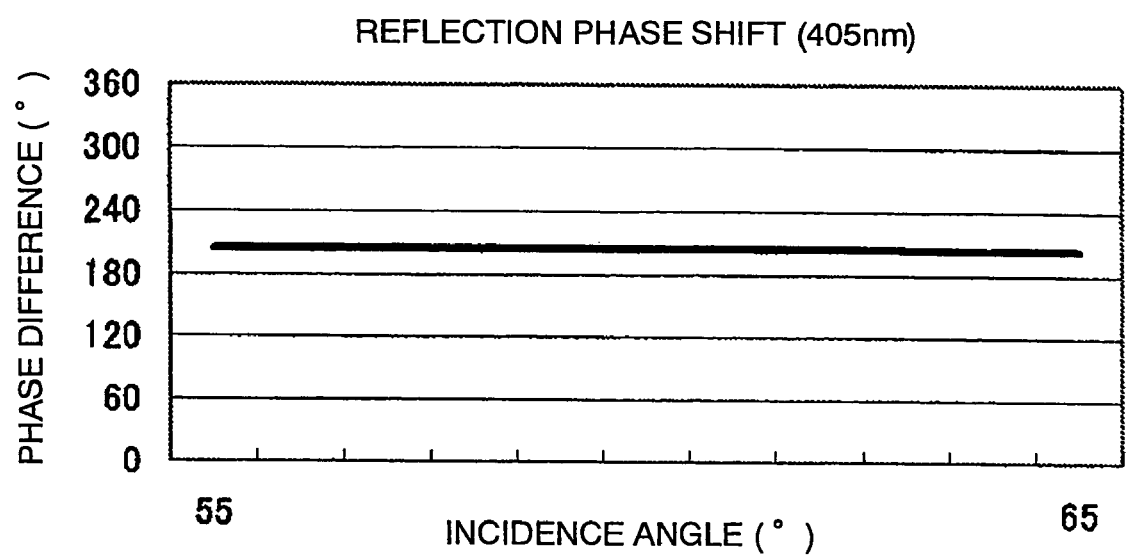
FIG. 5 is a graph showing the phase shift due to the reflection on the polarized light separation film used with the wavelength band of 405 nm and the incidence angle of 60±4°.

In FIGS. 4A to 4C, the polarized light separation characteristic of the polarized light separation film 103b used at the incidence angle of 60±4° (56° in FIG. 4A, 60° in FIG. 4B and 64° in FIG. 4C) with respect to the film surface in the wavelength band of 405 nm is shown in terms of transmittance in % (the thick line indicates transmittance of s-polarized light, and the thin line that of p-polarized light). The polarized light separation film 103b having this polarized light separation characteristic is optimized by changing the arrangement of the polarizing beam splitter 103 from that in the first embodiment, and in the practical range of wavelength of 400 nm to 415 nm and incidence angle of 60±4°, the characteristics sufficient for practical purposes, i.e. the transmittance Tp of more than 95% for the p-polarized light and the reflectivity Rs of 88±5% for the s-polarized light are obtained. FIG. 5 shows the phase change (phase shift of s-polarized light) due to reflection. As understood from FIG. 5, the phase shift due to reflection is substantially linear in the practical angular range.

As described above, the polarized light separation film 103b formed of a multilayer optical thin film has such a polarized light separation characteristic that a major portion of the s-polarized light component of the incident bundle of rays is reflected while a major portion of the p-polarized light component is transmitted. In order to improve this polarized light separation characteristic, the divergence angle range of the divergent bundle of rays is desirably reduced. In an ordinary optical pickup apparatus, therefore, a polarized light separation film is often formed on the attached surfaces in the glass cube and arranged in the diverging light path. In view of the fact that the polarized beam splitter in the form of glass cube is complicated and configured of many component elements with the attached surfaces, however, the cost is increased and the freedom of optical layout reduced resulting in a complicated optical configuration. Thus, the optical pickup apparatus and the optical disk apparatus having the optical pickup apparatus cannot be easily reduced in weight, thickness, size and cost.

The configuration according to this embodiment in which the shaped laser beam L1 is reflected on the polarized light separation film 103b in contact with the air, in contrast, not only simplifies the optical configuration of the optical path branches but also improves the freedom of optical layout. As a result, the optical pickup apparatus can be easily reduced in weight, thickness, size and cost. Also, the use of the polarizing beam splitter 103 of plane-parallel plate type can generate the astigmatism of the return light transmitted through the polarizing beam splitter 103, thereby making possible error detection and focusing by the astigmatism method. The resultant simplification of the fabrication process of the polarizing beam splitter 103 and omission of an astigmatism generating element contributes to a lower cost of the optical pickup apparatus. Also, the elimination of the attached surfaces eliminates the absorption by the adhesive layer, and therefore an optical system of high light utilization rate is realized. In this way, the application to high-density media using the blue-violet laser is made possible, thereby easily realizing an optical pickup apparatus simple in configuration and low in size and cost.

As described above, to improve the polarized light separation characteristic, the divergence angle range is desirably narrowed, and to secure the incidence angle dependency of the divergence angle range of the polarized light separation film, this embodiment uses the beam shaping element 101. Specifically, the beam shaping element 101 for reducing the divergence angle $\theta\perp$ is arranged before incidence of the polarizing beam splitter 103 and reduces the divergence angle in the direction along the long axis of the ellipse of the laser beam L1. Thus, in spite of the incidence in the air, the angle range of incidence to the polarized light separation film 103b is reduced to 45±4°. As a result, the light path can be branched with the optimum polarized light separation characteristic adapted to the incidence angle dependency of the polarizing beam splitter. Also, by reducing the incidence angle range using the beam shaping element 101, the reflection phase of the s-polarized light can be easily linearized with respect to the incident angle in the stage of film design.

Further, the polarizing beam splitter 103 is configured to transmit a part of the s-polarized light component of the incident laser beam L1. The laser beam L1 that has been transmitted through the polarizing beam splitter 103, after being passed through a stop 121 and a condensing lens 122, is received by a laser power monitor 120. The laser power monitor 120 is a monitoring photodetector for detecting the laser output of the blue laser source 100 by intensity of the laser beam L1 transmitted through the polarizing beam splitter 103. The laser power monitor 120 is tilted with respect to the principle ray of the laser beam L1 to prevent the ghost. The return light from the optical disk 150 enters the polarizing beam splitter 103 as p-polarized light, and therefore, a sufficiently high transmittance Tp can be obtained without the anti-reflection film 103c. Thus, the anti-reflection film 103c may be omitted. In the absence of the anti-reflection film 103c, however, a reflection loss not negligible is caused for the s-polarized light used by the laser power monitor 120. For this reason, the anti-reflection film 103c capable of increasing the transmittance Ts is desirably used.

From the viewpoint of the incidence angle dependency and the optical layout, the main polarized light component of the laser beam L1 incident to the polarizing beam splitter is desirably the s-polarized light and satisfies the conditional equation (1) below. Once the equation (1) is met, a more satisfactory light path branching is made possible by utilizing the polarized light separation characteristic of the polarized light separation film 103b.

$$35 \leq \theta 1 \leq 65 \tag{1}$$

where $\theta 1$ is the incidence angle in degrees (°) of the principle ray of the laser beam with respect to the polarizing beam splitter.

The laser beam L1 reflected on the polarizing beam splitter 103 enters a collimator optical system 104. The collimator optical system 104 converts the incident laser beam L1 into substantially parallel light beams. The collimator optical system 104 is configured of two lens elements in 2 groups, which includes a convex lens and a concave lens with an air gap between them. The air gap is variable by an actuator (not shown). By changing the air gap, the divergence angle of the exiting laser beam L1 is changed so that the wave front aberration caused by the thickness error of the optical disk 150 can be adjusted. The laser beam L1 converted into substantially parallel light beams by the collimator optical system 104 is converted into a circularly polarized light beam by a ¼ wave plate 105, and through an aperture stop 106, focused as a light spot on the information recording surface 150a of the optical disk 150 by means of the objective lens 107 at a predetermined numerical aperture (NA) of, say, 0.65 or 0.85. The objective lens 107 is not limited to a single lens but may be twin lenses.

The laser beam L1 focused on the information recording surface 150a is reflected on the information recording surface 150a into a return light beam, which returns to the polarizing beam splitter 103 through the objective lens 107, the aperture stop 106, the ¼ wave plate 105 and the collimator optical system 104 in this order. The laser beam L1, while returning to the polarizing beam splitter 103, is passed through the ¼ wave plate 105 and therefore enters the polarized light separation film 103b as p-polarized light beam. As long as the incidence angle $\theta 1$ of the laser beam L1 to the polarized light separation film 103b is not more than 45° and the angular range (aperture angle) $\alpha 1$ not more than 5°, the p-polarized light transmittance Tp of the polarized light separation film 103b can be increased to at least 90%. The polarizing beam splitter 103, therefore, can transmit the return light from the optical disk 50 with high efficiency. The laser beam L1 that has passed through the polarizing beam splitter 103 is condensed on the photodetector 130 of the signal system through a sensor lens 131.

This embodiment employs the astigmatism method for focusing error detection and the PP (push-pull) method or the DPP (differential push-pull) method for tracking error detection. As described above, the astigmatism is added to the laser beam L1 passing through the tilted plane-parallel plate 103a, and therefore a focus error signal can be produced with a simple configuration. The photodetector 130 is configured of multi-division PIN photodiodes, each producing an IV-converted voltage or a current output proportional to the intensity of the incident bundle of rays. This output is sent to a detection circuit system (not shown) thereby to generate an information signal, a focusing error signal and a tracking error signal. Based on the focusing error signal and the tracking error signal, the position of the objective lens 107 integrated with a two-dimensional actuator (not shown) including a magnetic circuit and a coil is controlled so that the light spot is focused always correctly on the information track.

Second Embodiment 3-wavelength Interchangeable Type

Figure 6:
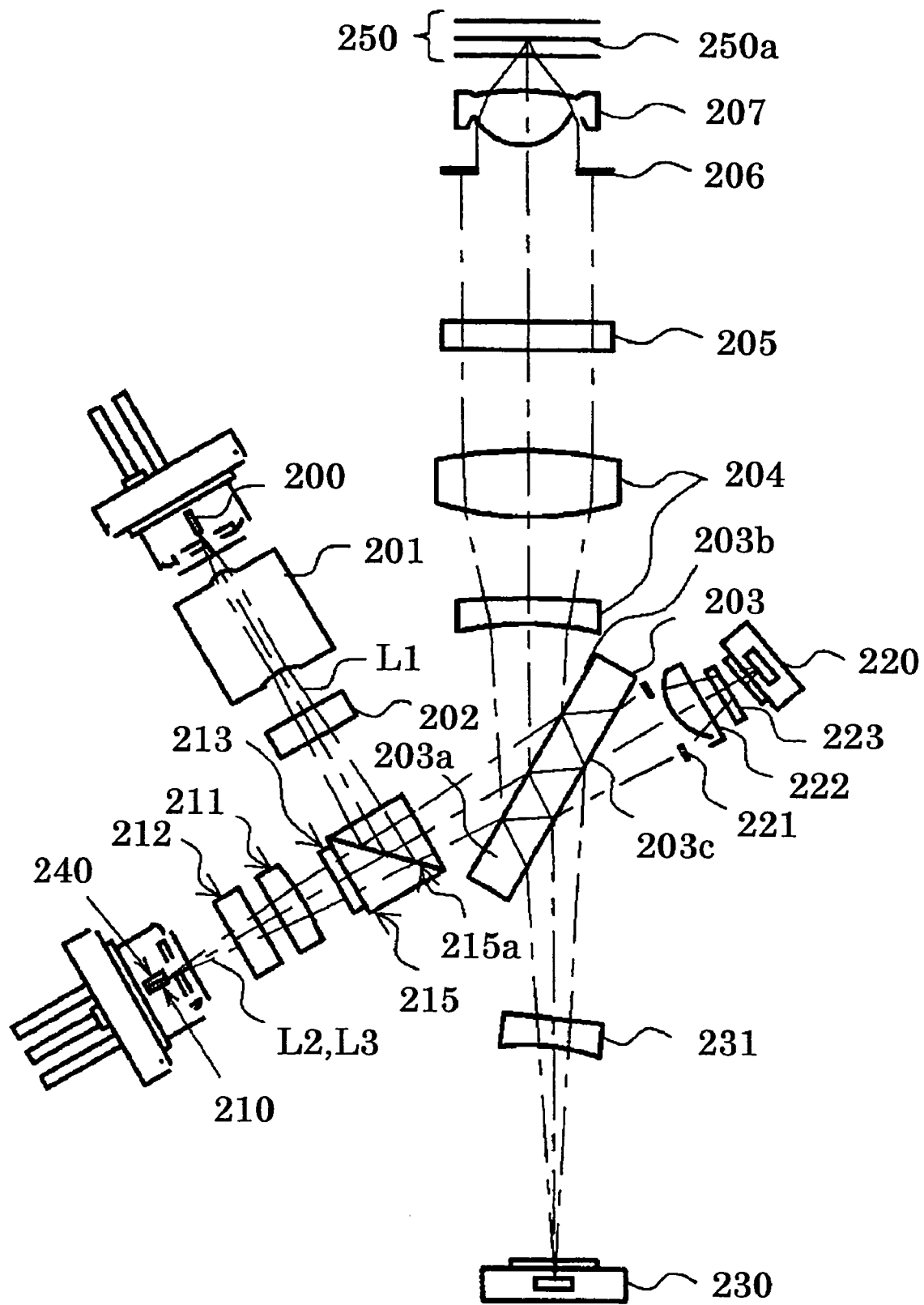
FIG. 6 is a diagram showing an optical configuration of an optical pickup apparatus according to a second embodiment of the invention.

FIG. 6 shows an optical configuration of the optical pickup apparatus according to a second embodiment of the invention. This optical pickup apparatus is of 3-wavelength interchangeable type capable of recording and reproducing the optical information in any of the high-density media adapted for the blue-violet laser, the optical information recording media adapted for the red laser and the optical information recording media adapted for the infrared laser. The optical pickup apparatus according to this embodiment comprises semiconductor laser sources including a blue laser source 200 for emitting the laser beam L1 in the wavelength band of 405 nm (=wavelength of 405±10 nm), a red laser source 210 for emitting the laser beam L2 in the wavelength band of 650 nm (=wavelength of 650±20 nm) and an infrared laser source 240 for emitting the laser beam L3 in the wavelength band of 780 nm (=wavelength of 780±20 nm). Two or more of the three laser sources 200, 210, 240 are never turned on at the same time. In accordance with the difference of thickness of the optical disk 250 or some information or other written in the information recording surface 250a, for example, one of the laser sources 200, 210, 240 to be used is determined. The means for this determination (not shown) is included in each optical pickup apparatus, and based on this determination, one of the three laser sources 200, 210, 240 is turned on. One of the laser beams L1 to L3 is thus emitted to record or reproduce the optical information on or from the information recording surface 250.

Among the three laser sources 200, 210, 240, the red laser source 210 and the infrared laser source 240 are encased in the same package in proximity to each other. In view of the fact that the two laser sources are arranged 110 μm distant from each other, however, the image-forming positions thereof are different from each other. Also, in spite of the fact that the optical information recording medium (corresponding to the optical disk 250 in the drawing) for the respective wavelengths has a different thickness up to the information recording surface 250a, the objective lens 207 described later is operated in such a manner that the laser beams L1 to L3 are focused at the same point on the information recording surface 250a in accordance with the optical disk 250 used for recording or reproduction.

The laser beam L1 emitted from the blue laser source 200 is a divergent bundle of rays having an elliptic light intensity distribution. The divergence angle $\theta_\parallel$ in the direction parallel to the active layer of the blue laser source 200 is along the short axis of the ellipse and, the divergence angle $\theta_\perp$ in the direction perpendicular to the active layer of the blue laser source 200 is along the long axis of the ellipse ($\theta_\parallel < \theta_\perp$). According to this embodiment, both the divergence angle $\theta_\parallel$ of 9° and $\theta_\perp$ of 23° are a full angle at half maximum. In the arrangement of the blue laser source 200 shown in FIG. 6, the divergence angle $\theta_\perp$ is parallel to the page and the divergence angle $\theta_\parallel$ is perpendicular to the page. Also, the laser beam L1 is polarized linearly with the electrical vector thereof in the direction parallel to the active layer of the blue laser source 200.

The laser beams L2, L3 emitted from the red and infrared laser sources 210, 240, on the other hand, are a divergent bundle of rays having an elliptic light intensity distribution. The divergence angle $\theta_\parallel$ in the direction parallel to the active layer of the red and infrared laser sources 210, 240 is along the short axis of the ellipse, and the divergence angle $\theta_\perp$ in the direction perpendicular to the active layer of the red and infrared laser sources 210, 240 is along the long axis of the ellipse ($\theta_\parallel < \theta_\perp$). According to this embodiment, the divergence angle $\theta_\parallel$ of 9° and $\theta_\perp$ of 16° are both a full angle at half maximum. In the arrangement of the red and infrared laser sources 210, 240 shown in FIG. 6, the divergence angle $\theta_\parallel$ is parallel to the page and the divergence angle $\theta_\perp$ is perpendicular to the page. Also, the laser beams L2, L3 are polarized linearly with the electrical vector thereof parallel to the active layers of the red and infrared laser sources 210, 240.

The laser beam L1 emitted from the blue laser source 200 in such a manner as to diverge with an elliptic light intensity distribution is shaped to a light intensity distribution desirable for the recording/reproduction characteristics by the beam shaping element 201. In a desirable light intensity distribution, the peripheral intensity ratio (rim intensity) of the bundle of rays incident to the objective lens 207 is, for example, 65% (radially of the disk) and 60% (tangentially of the disk). For assigning the divergence angle $\theta_\perp$ of 23° to the rim intensity of 65% (radially of the disk), NA (numerical aperture) of 0.155 of the laser beam L1 is led to the aperture stop 206 of the objective lens 207. For assigning the divergence angle $\theta_\parallel$ of 9° to the rim intensity of 60% (tangentially of the disk), on the other hand, the NA of 0.067 of the laser beam L1 is led to the aperture stop 206 of the objective lens 207. According to this embodiment, the desirable rim intensity is secured by setting the shaping magnification of the beam shaping element 201 in the direction of the divergence angle $\theta_\perp$ to 0.43 and no-coversion in the direction of the divergence angle $\theta_\parallel$.

The laser beam L1 shaped by the beam shaping element 201 enters the diffraction grating 202, for tracking by the DPP method or the 3-beam method, and is split into a main beam (0-order light) for recording/reproduction in and from the optical disk 250 and two sub-beams (±1-order light, not shown in FIG. 1) for detecting the tracking error. The laser beam (main beam) L1 that has emitted from the diffraction grating 202 enters a light path combining prism 215.

The laser beams L2, L3 emitted from the red and infrared laser sources 210, 240 in such a manner as to diverge with an elliptic light intensity distribution, on the other hand, enter a diffraction grating 212, for tracking by the DPP method or the 3-beam method, and are each split into a main beam (0-order light) for recording/reproduction in and from the optical disk 250 and two sub-beams (+1-order light beams, not shown in FIG. 6) for detecting the tracking error. The laser beams (main beams) L2, L3 exited from the diffraction grating 212 enter a coupling lens 211. This route is so configured that the laser beams L2, L3 enter the objective lens 207 with the elliptic light intensity distribution, and in order to secure equilibrium between the emission efficiency and the rim intensity, the coupling lens 211 converts the divergence angle of the laser beams L2, L3. The laser beams L2, L3 with the divergence angle thereof converted by the coupling lens 211 enter the light path combining prism 215 after the direction of polarization thereof is rotated by 90° by the ½ wave plate 213.

The configuration is such that the laser beams L2, L3 are not shaped, and therefore the divergence angle θ⊥ is required to be directed mainly tangentially of the disk. As for the laser beam L1, in contrast, the direction of the blue laser source 200 can be changed depending on the beam shaping. Therefore, the ½ wave plate 213 may be arranged on the laser beam L1 side instead of on the laser beams L2, L3 side. By arranging the ½ wave plate 213 as required and thus changing the relative positions of the optical elements, the thickness of the optical pickup apparatus as a whole can be reduced.

The light path combining prism 215 is configured of two glass prisms attached to each other through a dichroic film 215a formed of a multilayer optical thin film. The dichroic film 215a has the ability to select the wavelength by reflecting the laser beam L1 in the wavelength band of 405 nm and transmitting the laser beam L2 in the wavelength band of 650 nm and the laser beam L3 in the wavelength band of 780 nm. Thus, the three laser beams L1 to L3 enter the polarizing beam splitter 203 through a common light path combined by the light path combining prism 215.

The dichroic film 215a of the light path combining prism 215 may have the ability to select the wavelength by transmitting the laser beam L1 in the wavelength band of 405 nm and reflecting the laser beam L2 in the wavelength band of 650 nm and the laser beam L3 in the wavelength band of 780 nm. In such a case, the light path on the blue laser source 200 side and the light path on the red and infrared laser sources 210, 240 side are replaced with each other. Also, the light path combining prism 15 having the polarized light separation characteristic for the laser beams L2, L3 may be used for suppressing the return light. Further, the ½ wave plate 213 may be omitted as required.

When the laser beams L1 to L3 enter the polarizing beam splitter 203 of plane-parallel plate type, the incidence angle θ1 of the laser beams L1 to L3 to the polarized light separation film 203a is 60° and the angular range (aperture angle) α1 is 4°. The polarizing beam splitter 203 is configured of a transparent plane-parallel plate 203a constituting the base board, a polarized light separation film 203b formed of a multilayer optical thin film (or a multilayer optical thin film covered by a protective film) on one surface of the plane-parallel plate 203a, and an anti-reflection film 203c formed of a multilayer optical thin film (or a multilayer optical thin film covered with a protective film) on the other surface of the plane-parallel plate 203a. The polarized light separation film 203b has the polarized light separation characteristic whereby most of the s-polarized light component of the incident bundle of rays is reflected and most of the p-polarized light component is transmitted. The laser beams L1 to L3 thus are polarized in the direction of s-polarization with respect to the polarized light separation film 203b. Therefore, most of the laser beams L1 to L3 are reflected on the polarized light separation film 203b in contact with the air.

The configuration in which the laser beams L1 to L3 enter the polarized light separation film 203b of the polarizing beam splitter 203 at the incidence angle θ1 of 60° improves the polarized light separation performance and makes up a detection system with the plane-parallel plate 203a not excessively thick, large astigmatism and a relatively small coma. The configuration in which the angle θ⊥ is not limited to 45° also has the advantage of an improved design freedom of the optical pickup apparatus.

Figure 7A:
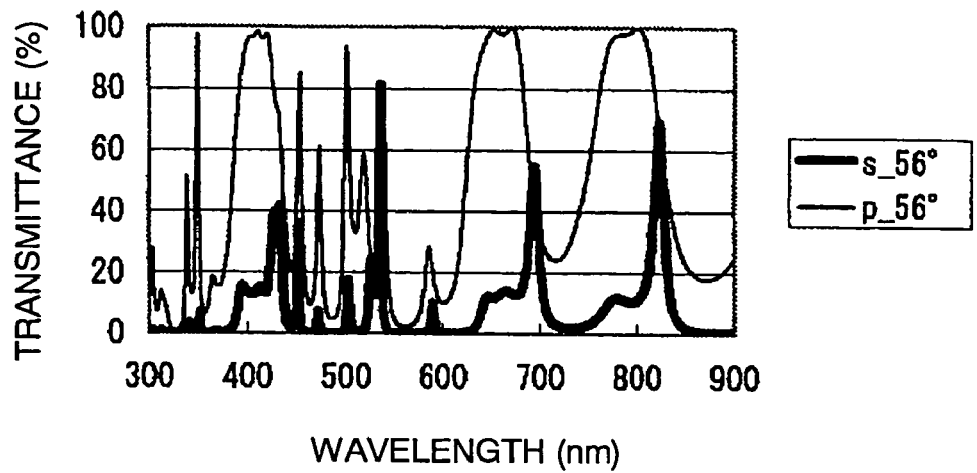
FIG. 7A is a graph showing the transmittance representing the polarized light separation characteristic of the polarized light separation film used with the wavelength bands of 405 nm, 650 nm and 780 nm and the incidence angle of 56°.
Figure 7B:
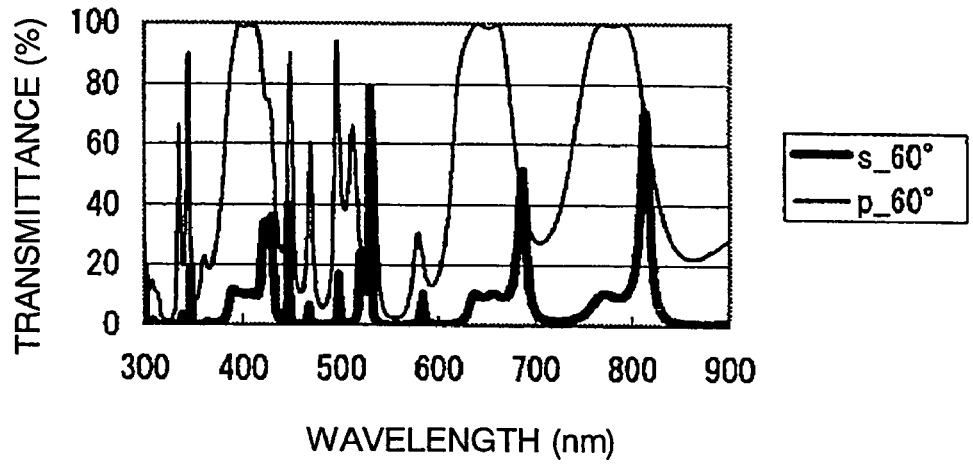
FIG. 7B is a graph showing the transmittance representing the polarized light separation characteristic of the polarized light separation film used with the wavelength bands of 405 nm, 650 nm and 780 nm and the incidence angle of 60°.
Figure 7C:
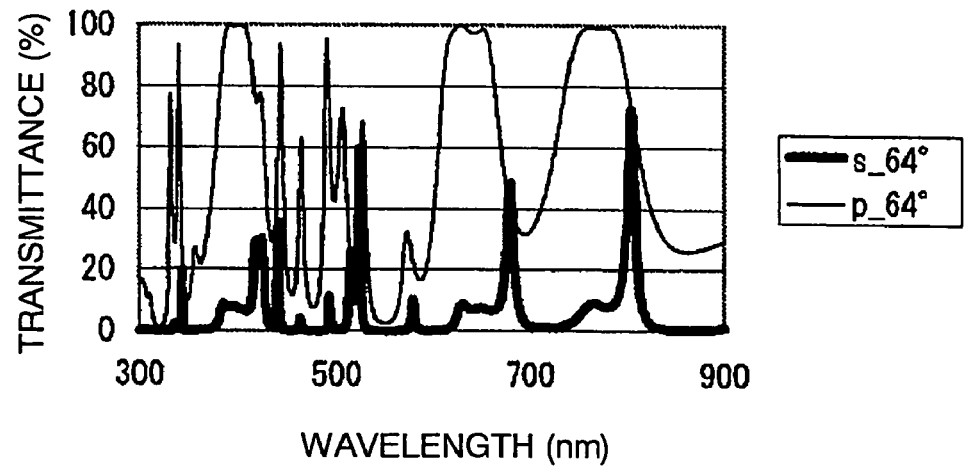
FIG. 7C is a graph showing the transmittance representing the polarized light separation characteristic of the polarized light separation film used with the wavelength bands of 405 nm, 650 nm and 780 nm and the incidence angle of 64°.
Figure 8A:
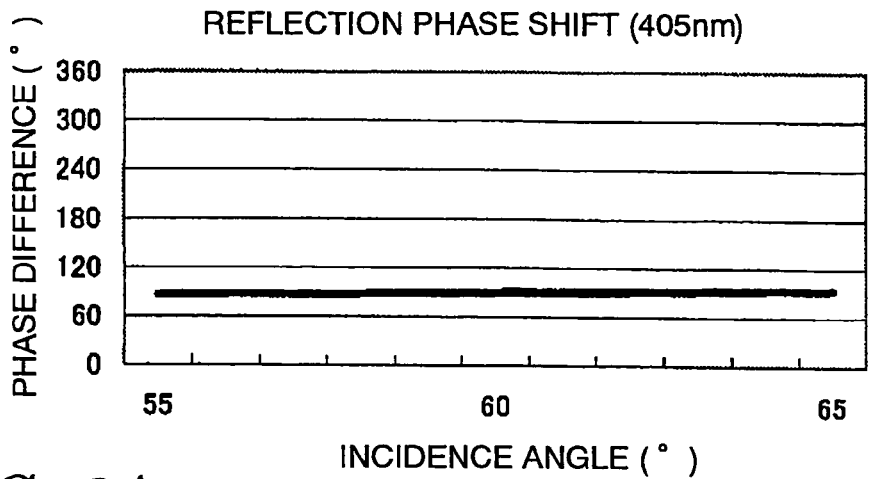
FIG. 8A is a graph showing the phase shift due to the reflection on the polarized light separation film used with the wavelength band of 405 nm and the incidence angle of 60±4°.
Figure 8B:
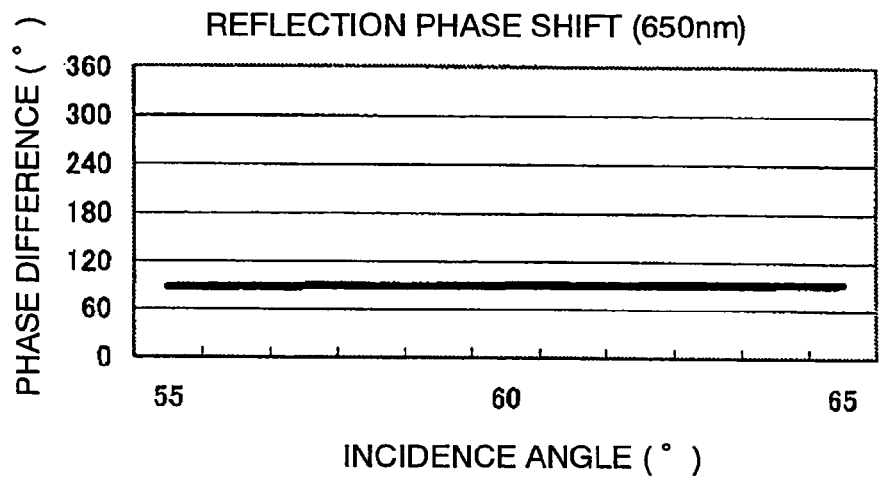
FIG. 8B is a graph showing the phase shift due to the reflection on the polarized light separation film used with the wavelength band of 650 nm and the incidence angle of 60±4°.
Figure 8C:
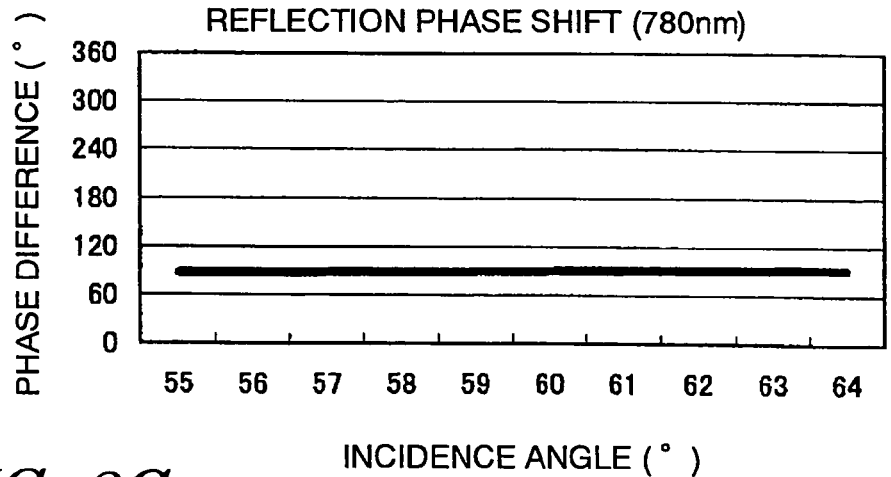
FIG. 8C is a graph showing the phase shift due to the reflection on the polarized light separation film used with the wavelength band of 780 nm and the incidence angle of 60±4°.

FIG. 7 shows the transmittance in % (the thick line indicates the transmittance of the s-polarized light, and the thin line the transmittance of the p-polarized light) representing the polarized light separation characteristic of the polarized light separation film 203b used in the three wavelength bands of 405 nm, 650 nm and 780 nm and the incidence angle of 60±4° to the film surface (56° in FIG. 7A, 60° in FIG. 7B and 64° in FIG. 7C). The polarized light separation film 203b having this polarized light separation characteristic is optimized according to the second embodiment. Specifically, such satisfactory characteristics are obtained that in the practical wavelength range of 400 nm to 415 nm with the incidence angle of 60±4°, the transmittance Tp of the p-polarized light is more than 92% and the reflectivity Rs of the s-polarized light is more than 95%; in the practical wavelength range of 650 nm to 665 nm with the incidence angle of 60±4°, the transmittance Tp of the p-polarized light is more than 90% and the reflectivity Rs of the s-polarized light is more than 95%; and in the practical wavelength range of 780 nm to 795 nm with the incidence angle of 60±3°, the transmittance Tp of the p-polarized light is more than 90% and the reflectivity Rs of the s-polarized light is more than 95%. FIGS. 8A to 8C show the phase change due to reflection (the phase shift of s-polarized light for the wavelength of 405 nm in FIG. 8, wavelength of 650 nm in FIG. 8B and wavelength of 780 nm in FIG. 8C). As understood from FIGS. 8A to 8C, the phase shift due to reflection is substantially linear in the practical angular range of each wavelength band.

Figure 9A:
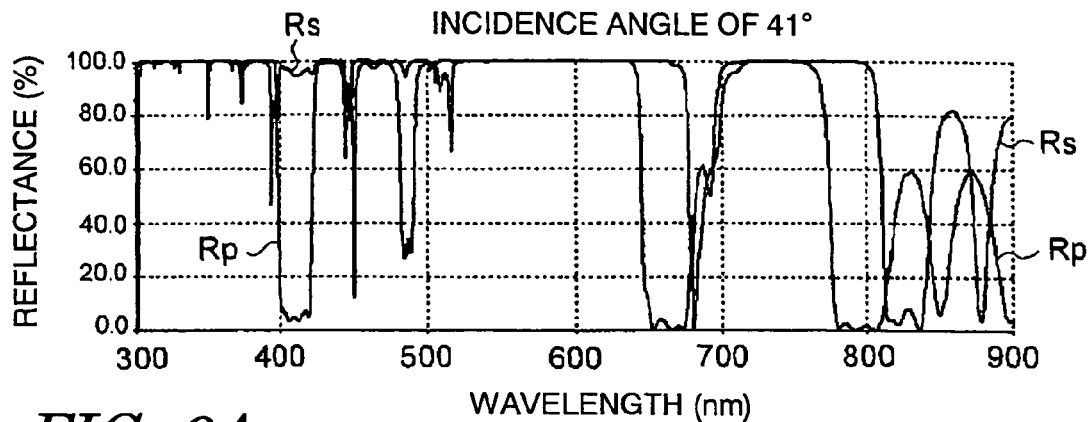
FIG. 9A is a graph showing the reflectivity representing the polarized light separation characteristic of the polarized light separation film used with the wavelength bands of 405 nm, 650 nm and 780 nm and the incidence angle of 41°.
Figure 9B:
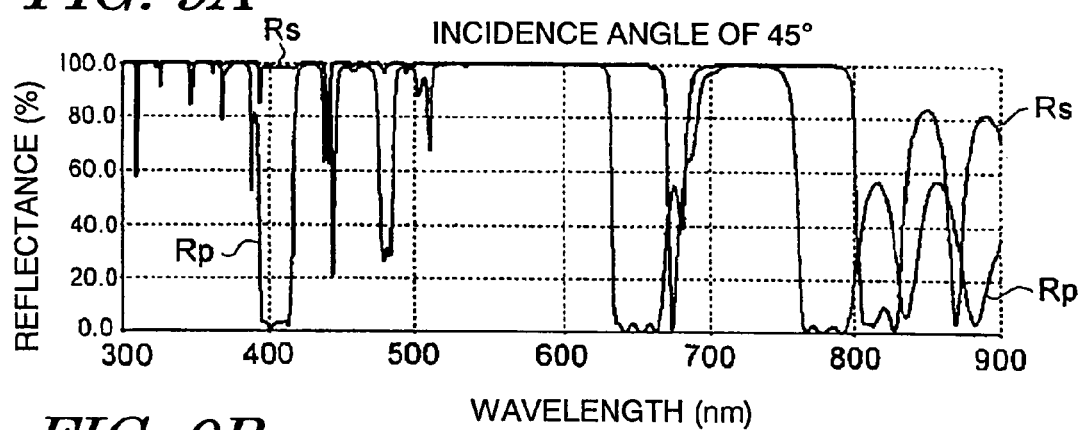
FIG. 9B is a graph showing the reflectivity representing the polarized light separation characteristic of the polarized light separation film used with the wavelength bands of 405 nm, 650 nm and 780 nm and the incidence angle of 45°.
Figure 9C:
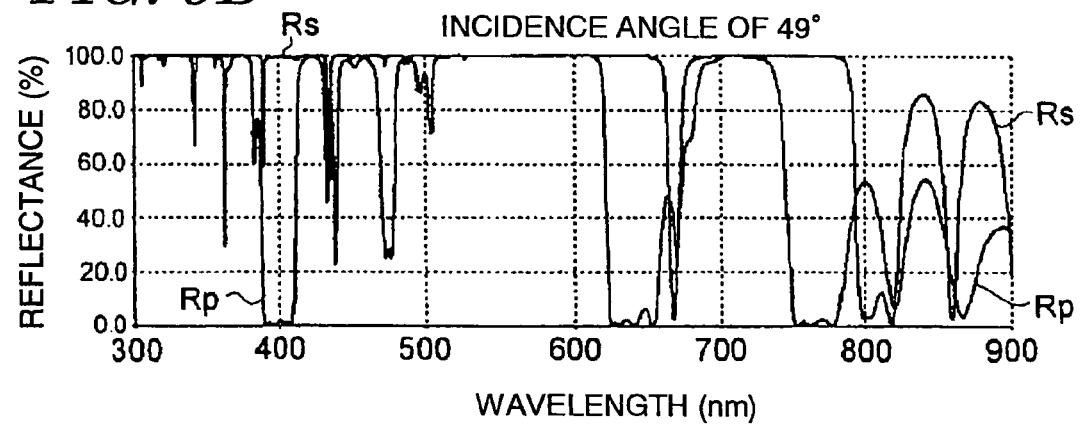
FIG. 9C is a graph showing the reflectivity representing the polarized light separation characteristic of the polarized light separation film used with the wavelength bands of 405 nm, 650 nm and 780 nm and the incidence angle of 49°.
Figure 10A:
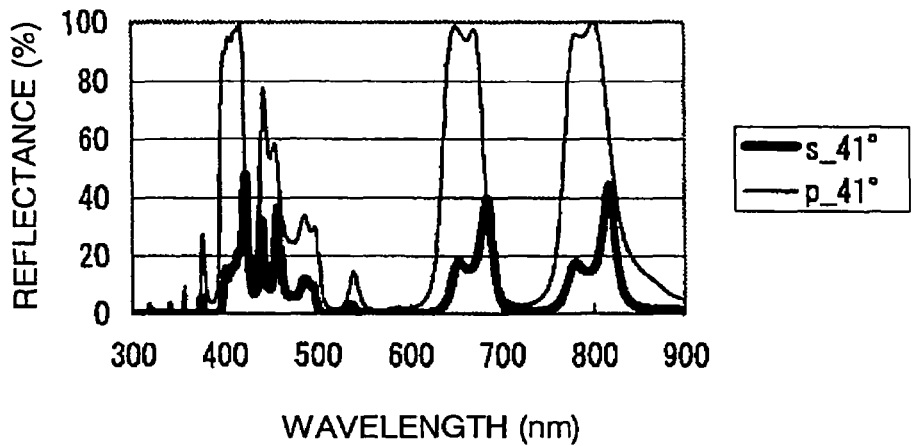
FIG. 10A is a graph showing the transmittance representing the polarized light separation characteristic of the polarized light separation film used with the wavelength bands of 405 nm, 650 nm and 780 nm and the incidence angle of 41°.
Figure 10B:
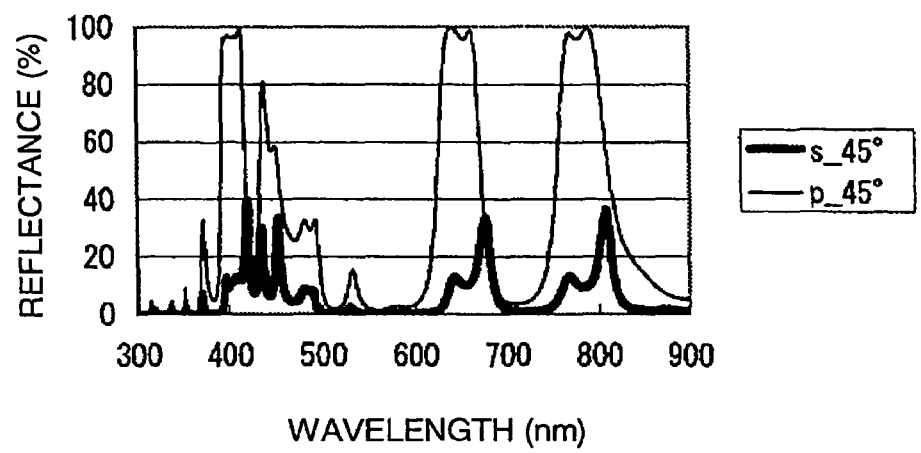
FIG. 10B is a graph showing the transmittance representing the polarized light separation characteristic of the polarized light separation film used with the wavelength bands of 405 nm, 650 nm and 780 nm and the incidence angle of 45°.
Figure 10C:
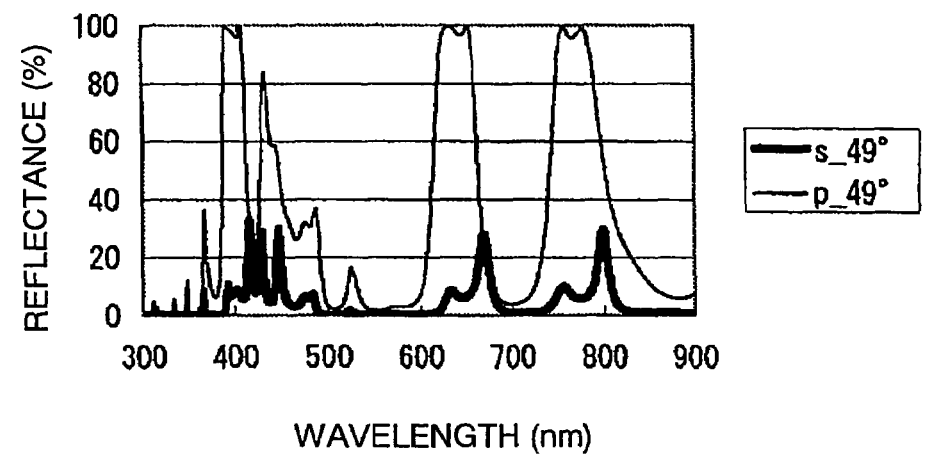
FIG. 10C is a graph showing the transmittance representing the polarized light separation characteristic of the polarized light separation film used with the wavelength bands of 405 nm, 650 nm and 780 nm and the incidence angle of 49°.
Figure 11A:
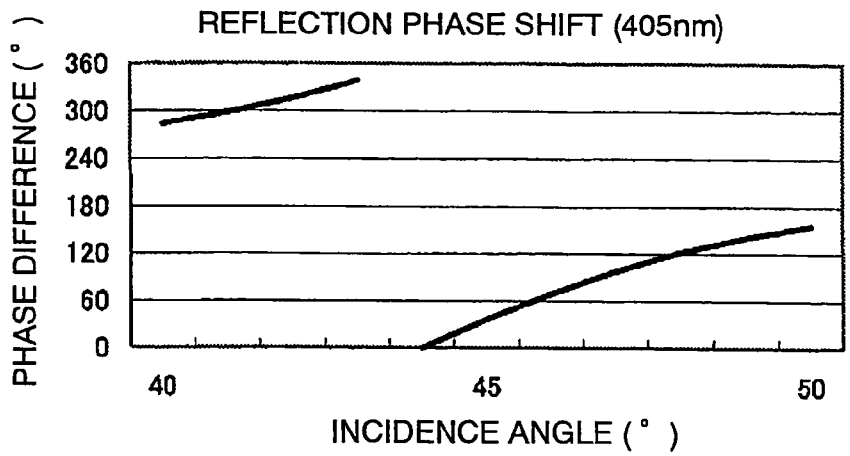
FIG. 11A is a graph showing the phase shift due to the reflection on the polarized light separation film used with the wavelength band of 405 nm and the incidence angle of 45±4°.
Figure 11B:
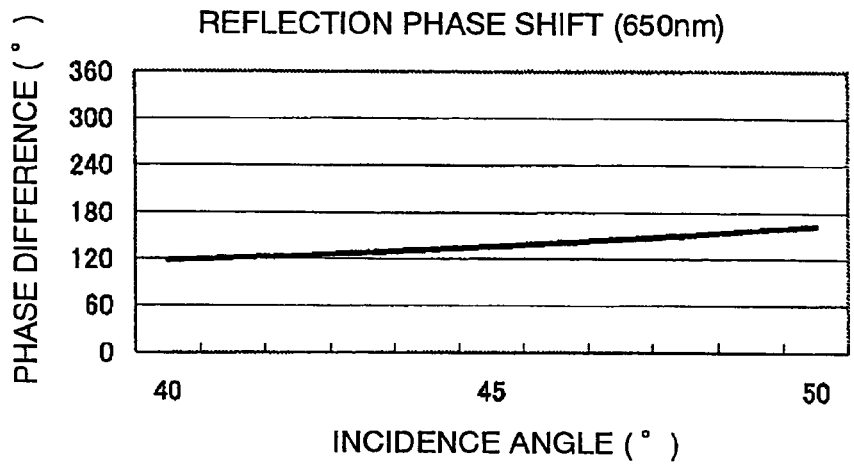
FIG. 11B is a graph showing the phase shift due to the reflection on the polarized light separation film used with the wavelength band of 650 nm and the incidence angle of 45±4°.
Figure 11C:
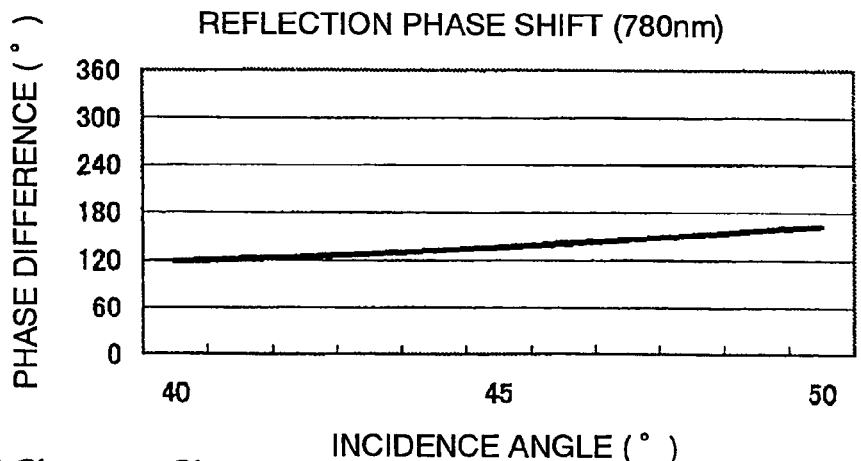
FIG. 11C is a graph showing the phase shift due to the reflection on the polarized light separation film used with the wavelength band of 780 nm and the incidence angle of 45±4°.

FIGS. 9A to 9C show the reflectivity in % (Rs indicates the reflectivity of the s-polarized light, and Rp the reflectivity of the p-polarized light) representing the polarized light separation characteristic of the polarized light separation film 203b used in the three wavelength bands of 405 nm, 650 nm and 780 nm and the incidence angle of 45±4° to the film surface (41° in FIG. 9A, 45° in FIG. 9B and 49° in FIG. 9C). FIGS. 10A to 10C show the transmittance in % (the thick line indicates the transmittance of the s-polarized light, and the thin line the transmittance of the p-polarized light) representing the polarized light separation characteristic of the polarized light separation film 203b used in the three wavelength bands of 405 nm, 650 nm and 780 nm and the incidence angle of 45±4° to the film surface (41° in FIG. 1A, 45° in FIG. 10B and 49° in FIG. 10C). The polarized light separation film 203b having this polarized light separation characteristic is optimized by changing the arrangement of the polarizing beam splitter from the state according to the second embodiment. Specifically, such satisfactory characteristics are obtained that in the practical wavelength range of 400 nm to 415 nm with the incidence angle of 45±4°, the transmittance Tp of the p-polarized light is more than 92% and the reflectivity Rs of the s-polarized light is more than 95%; in the practical wavelength range of 650 nm to 665 nm with the incidence angle of 45±4°, the transmittance Tp of the p-polarized light is more than 90% and the reflectivity Rs of the s-polarized light is more than 95%; and in the practical wavelength range of 780 nm to 795 nm with the incidence angle of 45±3°, the transmittance Tp of the p-polarized light is more than 90% and the reflectivity Rs of the s-polarized light is more than 95%. FIGS. 11A to 11C show the phase change due to reflection (the phase shift of the s-polarized light for the wavelength of 405 nm in FIG. 11A, wavelength of 650 nm in FIG. 11B and wavelength of 780 nm in FIG. 11C. As understood from FIGS. 11A to 11C, the phase shift due to reflection is substantially linear in the practical angular range of each wavelength band.

As described above, the polarized light separation film 203b configured of a multilayer optical thin film has such a polarized light separation characteristic as to reflect a major portion of the s-polarized light component and to transmit a major portion of the p-polarized light component of the incident bundle of rays. In order to improve this polarized light separation characteristic, the range of the divergence angle for the diverging bundle of rays is desirably narrowed. In the ordinary optical pickup apparatus, therefore, the polarized light separation film is often formed on the attached surfaces in the glass cube and arranged in the light path of the diverging bundle of rays. The polarizing beam splitter of glass cube type with the attached surfaces, however, has a complicated configuration with a great number of component parts, and therefore increases the cost while at the same time reducing the freedom of optical layout, thereby complicating the optical configuration. As a result, the optical pickup apparatus and the optical disk apparatus on which the optical pickup apparatus is mounted cannot be easily reduced in weight, thickness, size and cost.

The configuration according to this embodiment in which the shaped laser beams L1 to L3 are reflected on the polarized light separation film 203b in contact with the air both simplifies the optical configuration of the light path branches and increases the freedom of the optical layout, thereby making it easy to reduce the weight, thickness, size and cost of the optical pickup apparatus. Also, the use of the polarizing beam splitter 203 of plane-parallel plate type makes it possible to generate the astigmatism for the return light transmitted through the polarizing beam splitter 203. Thus, the focusing and the error detection by astigmatism become possible. The resultant simplified steps of fabrication of the polarizing beam splitter 203 and the omission of the astigmatism generating element contribute to a lower cost of the optical pickup apparatus. Also, in the absence of the attached surfaces, an optical system having a high light utilization rate is realized by the lack of absorption by the adhesive layer. As a result, a compact, inexpensive optical pickup apparatus having a simple configuration applicable to high-density media using the blue-violet laser is realized.

As described above, in order to improve the polarized light separation characteristic, the divergence angle range is desirably narrow. To secure the incidence angle dependency of the divergence angle range of the polarized light separation film, this embodiment employs the beam shaping element 201. Specifically, the beam shaping element 201 for reducing the divergence angle $\theta\perp$ is arranged before incidence to the polarizing beam splitter 203. This beam shaping element 201 narrows the divergence angle in the direction along the long axis of the ellipse of the laser beams L1 to L3, so that the range of incidence angle to the polarized light separation film 203b, though in the air, is narrowed to 60±4°. As a result, the light path can be branched with the optimum polarized light separation characteristic adapted to the incidence angle dependency of the polarizing beam splitter. Further, by narrowing the incidence angle range using the beam shaping element 201, the reflection phase of the s-polarized light can be linearized easily in film design stage. Also according to this embodiment, from the viewpoint of the incidence angle dependency and the optical layout described above, the main polarized light components of the laser beams L1 to L3 incident to the polarizing beam splitter 203 are desirably s-polarized light, and desirably satisfies the conditional equation (1). Once the conditional equation (1) is satisfied, an even more satisfactory light path branching becomes possible taking advantage of the polarized light separation characteristic of the polarized light separation film 203b.

The polarizing beam splitter 203 is so configured as to transmit a part of the s-polarized light component of the incident laser beams L1 to L3. The laser beams L1 to L3 that have been transmitted through the polarizing beam splitter 203 are received by a laser power monitor 220 through a stop 221, a condensing lens 222 and an optical filter 223. The laser power monitor 220 is a monitoring photodetector for detecting the laser output of the laser sources 200, 210, 240 with the laser beams L1 to L3 transmitted through the polarizing beam splitter 203. In order to prevent the ghost, the laser power monitor 22 is tilted with respect to the principle ray of the laser beams L1 to L3. The return light from the optical disk 250 enters the polarizing beam splitter 203 as p-polarized light, and therefore a sufficiently high transmittance Tp is obtained without the anti-reflection film 203. Thus, the anti-reflection film 203c may be done without. In the absence of the anti-reflection film 203c, however, the s-polarized light used by the laser power monitor 200 develops a reflection loss not negligible. For this reason, the anti-reflection film 203c capable of improving the transmittance Ts is desirably employed.

An optical filter 223 satisfying the conditional equation (2) below for the laser beams L1 to L3 transmitted through the polarizing beam splitter 203 is arranged between the polarizing beam splitter 203 and the laser power monitor 220. The use of the optical filter 223 satisfying the conditional equation (2) makes it possible to monitor the laser output with a luminous energy corresponding to the wavelength.

$$TS655 < TS405 \tag{2}$$

where TS405 is the transmittance (%) of the s-polarized light component with the wavelength of 405 nm, and TS655 the transmittance (%) of the s-polarized light component with the wavelength of 655 nm.

Figure 13:
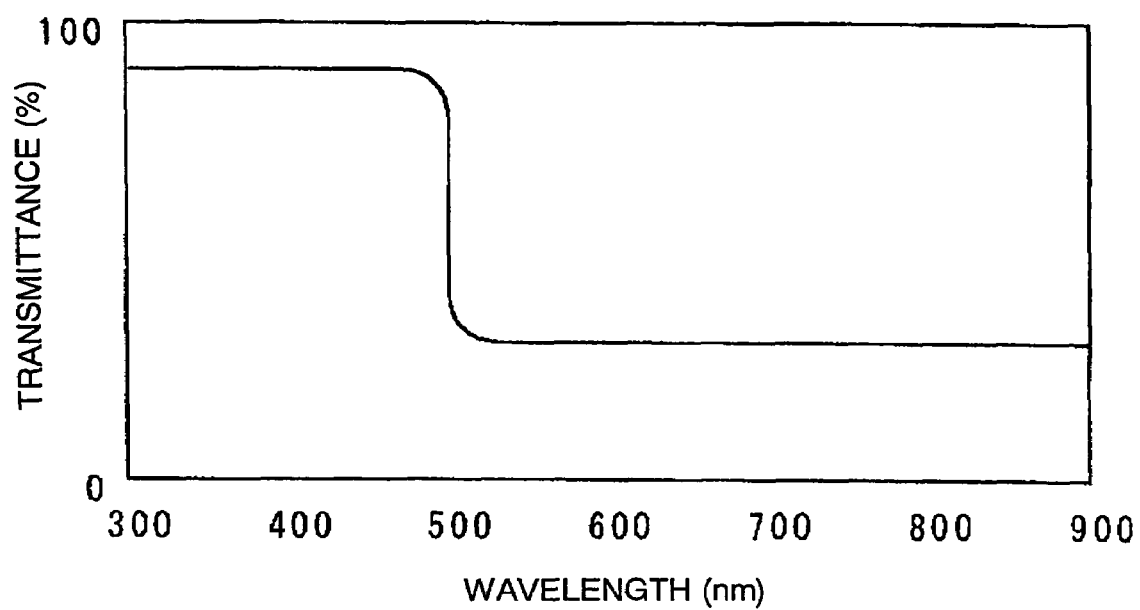
FIG. 13 is a graph showing the spectral transmittance characteristic of the optical filter used in the second and third embodiments.

The optical filter 223 having the ability to select the wavelength adjusts the color balance of the laser beams L1 to L3 transmitted through the polarizing beam splitter 203. The laser power monitor 220 detects the laser output of the laser sources 200, 210, 240 with the laser beams L1 to L3 transmitted through the optical filter 203. The laser outputs of the laser sources 200, 210, 240 are different from each other, and so is the sensitivity ratio (300 mA/W, 400 mA/W, for example) for the wavelength of the photodetector used with the laser power monitor 220. To meet the requirement of the three wavelengths with the same laser power monitor 220, therefore, the balance is required to secure the same output configured of the received luminous energy and the light receiving sensitivity. Generally, the blue laser source is lower in laser output than the red laser source and the infrared laser source. Therefore, it is desirable to reduce (by 30 to 60%, for example) the luminous energy of the red and infrared laser beams L2, L3 by the optical filter 223. The optical filter 223 having the spectral transmittance characteristic as shown in FIG. 13, for example, is desirably used. In the case where the standard (0.35 mW for high-density media, and 0.70 to 1.00 mW for DVD/CD, for example) of the radiation luminous energy on the optical disk 250 is exceeded, the recorded information held in the optical disk 250 may be erased, while in the case where the radiation luminous energy is lower than the standard, on the other hand, it becomes difficult to read the recorded information. For this reason, it is desirable to use the optical filter 223 having the spectral transmittance characteristic taking the luminous energy standard of the optical disk 250 involved into account.

According to this embodiment, the optical filter 223 is arranged between the condensing lens 222 and the laser power monitor 220. Nevertheless, the optical filter 223 may be arranged at any place between the polarizing beam splitter 203 and the laser power monitor 220. For example, the optical filter 223 may be arranged on the laser power monitor 220, or configured of a filter film formed on the back of the polarizing beam splitter 203. In the case where the filter film is formed on the back of the plane-parallel plate 203a making up the polarizing beam splitter 203, the optical filter 223 can be configured at low cost without increasing the number of parts. In such a case, the signal light path and the light path to the laser power monitor 220 are liable to be superposed one on the other thereby to affect the monitor light. By reducing the incidence angle and increasing the thickness of the plane-parallel plate 203a, however, the light path is split by refraction thereby to avoid the superposition.

As described above, the laser output of the red and infrared laser sources 210, 240 is larger than that of the blue laser source 200, and therefore the transmittance of the polarizing beam splitter 203 against the p-polarized light of the laser beams L2, L3 may be low. The incidence angle characteristic, however, is preferably flat, or if not flat, is preferably such that the transmittance of the p-polarized light is high for both the laser beams L2 and L3 in the case where the incidence angle undergoes a change. Also, since the red and infrared laser sources 210, 240 have a large laser output, the polarizing beam splitter 203 for branching the light path with the half mirror function not dependent on the polarization may be employed only for the laser beams L2, L3.

The laser beams L1 to L3 reflected on the polarizing beam splitter 203 enter the collimator optical system 204. The collimator optical system 204 converts the incident laser beams L1 to L3 into substantially parallel beams. The collimator optical system 104 is configured of two lens elements in 2 groups, which includes a convex lens and a concave lens with an air gap between them. The air gap is variable by an actuator (not shown). By changing the air gap and hence the divergence angle of the laser beams L1 to L3 emitted, the wavefront aberration caused by the board thickness error of the optical disk 250 can be adjusted. The laser beams L1 to L3 that have been converted into substantially parallel beams by the collimator optical system 204 are converted into circularly polarized light by the ¼ wave plate 205, and after passing through the aperture stop 206, enter the objective lens 207 of wavelength interchangeable type having a satisfactory focusing performance for the three wavelengths. Then, the laser beams are formed as a light spot on the information recording surface 250a of the optical disk 250. The objective lens 207 is not limited to a single lens but may be twin lenses.

The convergent bundle of light rays corresponding to the optical disk 250 is generated by the objective lens 207. Assuming that the practical NA of the laser beams L1, L2 and L3 are about 0.85, 0.65 and 0.50, respectively, the incidence angle ranges are ±4°, ±3.1° and ±2.4°, respectively. In these incidence angle ranges, the polarized light separation film 203B is designed for the laser beams L1 to L3 of the three wavelengths. A liquid crystal correcting element for correcting the spherical aberration and the coma may be arranged before the objective lens 207. By using the liquid crystal correcting element, the spherical aberration can be adjusted in the same manner as the configuration for mechanically changing the air gap of the collimator optical system 204.

The laser beams L1 to L3 focused on the information recording surface 250a are reflected on the information recording surface 250a into the return light, and through the objective lens 207, the aperture stop 206, the ¼ wave plate 205 and the collimator optical system 204, returns to the polarizing beam splitter 203. The laser beams L1 to L3, on their way to the polarizing beam splitter 203, pass through the ¼ wave plate 205 and therefore enter the polarized light separation film 203b as p-polarized light. In the case where the incidence angle θ1 of the laser beams L1 to L3 to the polarized light separation film 203b is 45° or less and the angular range (aperture angle) α1 is 5° or less, the p-polarized light transmittance Tp of the polarized light separation film 203 can be increased to at least 90%. Thus, the polarizing beam splitter 203 can transmit the return light from the optical disk 250 with high efficiency. The laser beams L1 to L3 transmitted through the polarizing beam splitter 203 are condensed on the photodetector 230 of the signal system through the sensor lens 231.

According to this embodiment, the astigmatism method is employed for detecting the focusing error, and the PP (push-pull) method or the DPP (differential push-pull) method is employed for detecting the tracking error. As described above, the astigmatism is added while the laser beams L1 to L3 pass through a tilted plane-parallel plate 203a, and therefore the focus error signal can be obtained with a simple configuration. The photodetector 230 is configured of multiple divisions of the PIN photodiode and outputs an IV-converted voltage or a current output proportional to the intensity of the incident bundle of rays. This output is sent to a detection circuit system (not shown) thereby to generate an information signal, a focus error signal and a track error signal. Based on the focus error signal and the track error signal, the position of the objective lens 207 integrated with a two-dimensional actuator (not shown) including a magnetic circuit and a coil is controlled, so that an optical spot is always set in position on the information track.

Third Embodiment 3-wavelength Interchangeable Type

Figure 12:
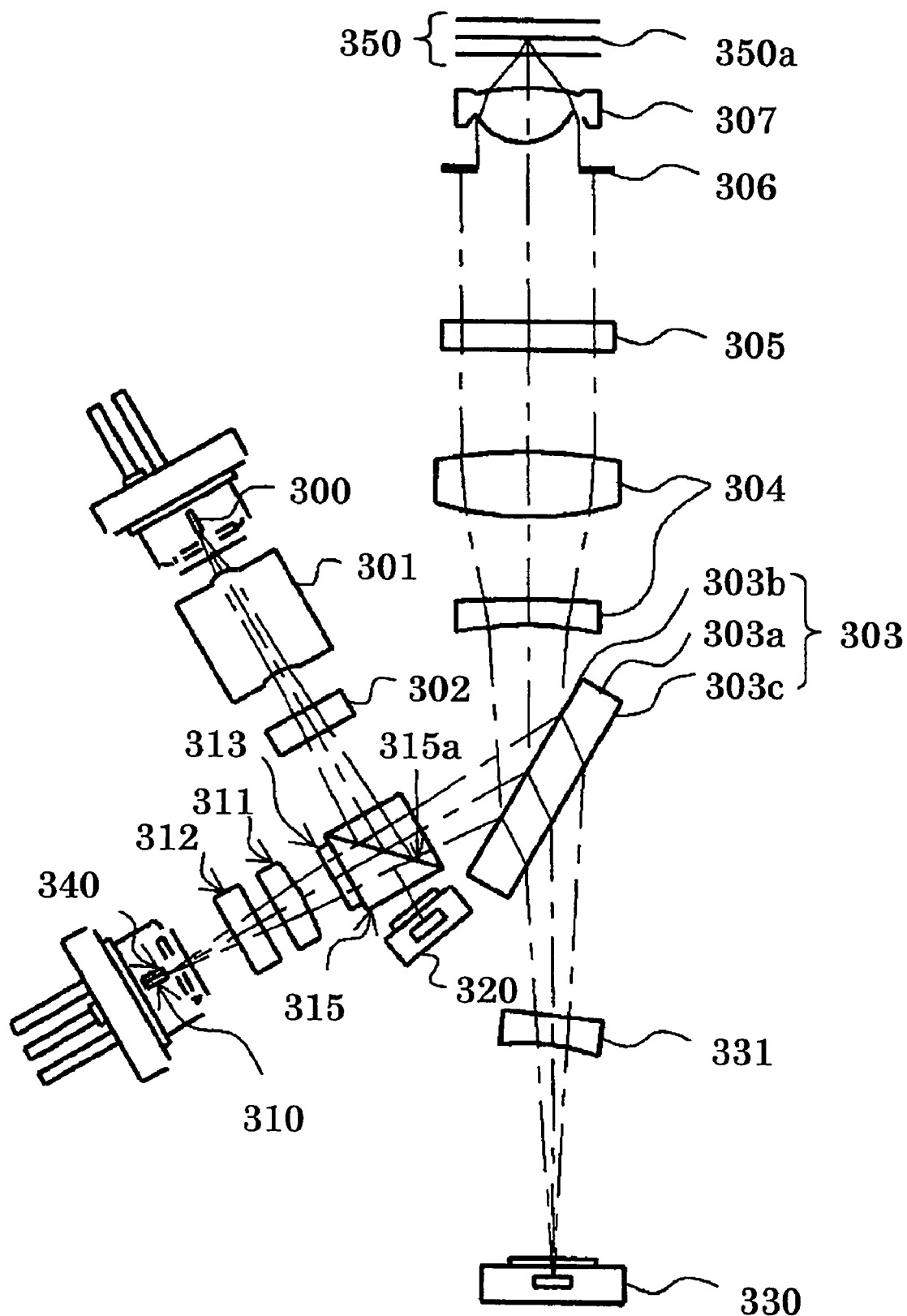
FIG. 12 is a diagram showing an optical configuration of an optical pickup apparatus according to a third embodiment of the invention.

FIG. 12 shows an optical configuration of an optical pickup apparatus according to the third embodiment of the invention. This optical pickup apparatus is so configured that the laser beam L1 transmitted through the dichroic film 315a of the light path combining prism 315 and the laser beams L2, L3 reflected on the dichroic film 315a are received by a laser power monitor 320 thereby to detect the laser output of each of the laser sources 300, 310, 340. This embodiment is similar to the second embodiment except that the laser power monitor 320 is arranged differently. That is to say, though the explanation is omitted, a beam shaping element 301, a coupling lens 311, diffracting gratings 302, 312, a ½ wave plate 313, a polarizing beam splitter 303, a collimator optical system 304, a ¼ wave plate 305, an aperture stop 306, an objective lens 307, an optical disk 350, and a sensor lens 331 are similar to that of the second embodiment. With the configuration similar to the second embodiment, a similar effect can be produced.

As an example of the polarized light separation characteristic of the dichroic film 315a according to this embodiment, the s-polarized light reflectivity Rs is 90% and the s-polarized light transmittance Ts is 10%, with a large p-polarized light reflectivity, for the laser beam L1 in the wavelength band of 405 nm, while the s-polarized light reflectivity is 5 to 10% and the s-polarized light transmittance is 90 to 95%, with a large p-polarized light transmittance, for the laser beam L2 in the wavelength band of 650 nm and the laser beam L3 in the wavelength band of 780 nm. By using the light path combining prism 315 having this polarized light separation characteristic, the unnecessary polarized light component for the laser power monitor 320 can be advantageously saved to the polarizing beam splitter 303. With regard to the laser beam L1 in the wavelength band of 405 nm having the s-polarized light reflectivity Rs of 90% and the s-polarized light transmittance Ts of 10% with a large p-polarized light transmittance, on the other hand, the return light from the optical disk 350 can be advantageously suppressed by double polarized light separation.

According to this embodiment, the beam intensity for the laser power monitor 320 is increased and therefore the condensing lens may be done without. Though also omitted from this embodiment, an optical filter (having the characteristic shown in FIG. 13, for example) may be arranged between the light path combining prism 315 and the laser power monitor 320 as in the second embodiment. In the case where a filter film making up the optical filter is applied to the side of the light path combining prism 315 nearer to the laser power monitor 320, a compact configuration can be obtained with the aforementioned advantages.

Each of the embodiments described above includes the configurations (i), (ii) and so forth, described below, whereby a compact, inexpensive optical pickup apparatus is realized with a simple configuration applicable to high-density media using the blue-violet laser.

(i) An optical pickup apparatus comprising a semiconductor laser source for emitting a laser beam in the wavelength band of 405 nm, a beam shaping element for shaping the light intensity distribution of the laser beam emitted divergently from the semiconductor laser source from elliptic to circular form, a polarizing beam splitter for reflecting the laser beam shaped by the beam shaping element, on a polarized light separation film in contact with the air, and an objective lens for focusing the laser beam reflected on the polarizing beam splitter, on an optical information recording medium.

(ii) An optical pickup apparatus comprising a first semiconductor laser source for emitting a laser beam in the wavelength band of 405 nm, a second semiconductor laser source for emitting a laser beam in the wavelength band of 650 nm, a beam shaping element for shaping the light intensity distribution of the laser beam emitted divergently from the first semiconductor laser source from elliptic to circular form, a light path combining means for combining the light path of the laser beam shaped by the beam shaping element with the light path of the laser beam emitted from the second semiconductor laser source by means of a multilayer optical thin film, a polarizing beam splitter for reflecting the laser beam with the light paths thereof combined by the light path combining means, on a polarized light separation film in contact with the air, and an objective lens for focusing the laser beam reflected on the polarizing beam splitter, on an optical information recording medium.

(iii) An optical pickup apparatus comprising a first semiconductor laser source for emitting a laser beam in the wavelength band of 405 nm, a second semiconductor laser source for emitting a laser beam in the wavelength band of 650 nm, a third semiconductor laser source located in proximity to the second semiconductor laser source for emitting a laser beam in the wavelength band of 780 nm, a beam shaping element for shaping the light intensity distribution of the laser beam emitted divergently from the first semiconductor laser source from elliptic to circular form, a light path combining means for combining, by means of a multilayer optical thin film, the light path of the laser beam shaped by the beam shaping element with the light paths of the laser beams emitted from the second and third semiconductor laser sources, a polarizing beam splitter for reflecting the laser beams with the light paths thereof combined by the light path combining means, on a polarized light separation film in contact with the air, and an objective lens for focusing the laser beam reflected on the polarizing beam splitter, on an optical information recording medium.

(iv) An optical pickup apparatus according to any one of (i) to (ii), wherein the divergence angle in the direction along the long axis of the ellipse of the laser beam is reduced by the shaping process in the beam shaping element.

(v) An optical pickup apparatus according to any one of (i) to (iv), wherein the main polarized light component of the laser beam incident to the polarizing beam splitter is the s-polarized light and satisfies the conditional equation (1).

(vi) An optical pickup apparatus according to any one of (ii) to (v), further comprising an optical filter for satisfying the conditional equation (2) with regard to a part of the s-polarized light component of the laser beam transmitted through the polarized beam splitter, and a monitoring photodetector for detecting the laser output of each semiconductor laser source with the laser beam transmitted through the optical filter.

(vii) An optical pickup apparatus according to any one of (ii) to (v), further comprising an optical filter for satisfying the conditional equation (2) with regard to a part of the s-polarized light component of the laser beam transmitted through the polarized beam splitter, and a monitor photodetector for detecting the laser output of each semiconductor laser source with the laser beam transmitted through the optical filter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. An optical pickup apparatus comprising:
a first semiconductor laser source which emits a first laser beam in a wavelength band of 405 nm having an elliptic light intensity distribution;
a second semiconductor laser source which emits a second laser beam in a wavelength band of 650 nm;
a beam shaping element which shapes the light intensity distribution of the first laser beam emitted from the first semiconductor laser source;
a light path combiner which combines a light path of the first laser beam shaped by the beam shaping element and a light path of the second laser beam emitted from the second semiconductor laser source;
a polarizing beam splitter having a polarized light separation film in contact with the air, the polarizing beam splitter reflecting the first and second laser beams having a combined light path combined by the light path combiner on the polarized light separation film;
an objective lens which focuses the first and second laser beams reflected on the polarized light separation film, onto an optical information recording medium;
an optical filter which satisfies a following condition with regard to a part of a s-polarized light component of the first and second laser beams transmitted through the polarizing beam splitter,

$TS655 < TS405$ where
TS405 represents a transmittance (%) of the s-polarized light component with a wavelength of 405 nm, and
TS655 represents a transmittance (%) of the s-polarized light component with a wavelength of 655 nm; and
a detector which detects an intensity of the first and second laser beams transmitted through the optical filter.

2. An optical pickup apparatus as claimed in claim 1, wherein the polarizing beam splitter has a plane-parallel plate and wherein the polarized light separation film is formed on one surface of the plane-parallel plate.

3. An optical pickup apparatus as claimed in claim 1, wherein the beam shaping element reduces a divergence angle in a direction along a long axis of the elliptic light intensity distribution of the first laser beam.

4. An optical pickup apparatus as claimed in claim 1, wherein main polarized light component of a laser beam incident to the polarizing beam splitter is s-polarized light, and wherein the following condition is satisfied, $$35 \leq \theta 1 \leq 65$$

where $\theta 1$ is an incidence angle (°) of a principle ray of the laser beam incident to the polarizing beam splitter.

5. An optical pickup apparatus as claimed in claim 1, wherein the light path combiner transmits either the first laser beam or the second laser beam, and reflects the other laser beam.

6. An optical pickup apparatus as claimed in claim 1, further comprising a detector detecting intensities of the first and second laser beams exiting from the light path combiner, the exiting laser beams not traveling toward the polarizing beam splitter.

7. An optical pickup apparatus as claimed in claim 1, wherein a first phase shift of s-polarized light component of the first laser beam and a second phase shift of s-polarized light component of the second laser beam are caused due to reflection on the polarized light separation film, and wherein the first and second phase shift are substantially linear in a predetermined angular range.

8. An optical pickup apparatus as claimed in claim 7, wherein, the first and second phase shifts are substantially linear in the angular range of ±4° of a predetermined incidence angle.

9. An optical pickup apparatus as claimed in claim 1, further comprising a coupling lens situated between the second semiconductor laser source and the light path combiner, the coupling lens converting a divergence angle of the second laser beam.

10. An optical pickup apparatus comprising:
a first semiconductor laser source which emits a first laser beam in a wavelength band of 405 nm having an elliptic light intensity distribution;
a second semiconductor laser source which emits a second laser beam in a wavelength band of 650 nm;
a third semiconductor laser source which emits a third laser beam in a wavelength band of 780 nm, the third semiconductor laser source being located in proximity to the second semiconductor laser source;
a beam shaping element which shapes the light intensity distribution of the first laser beam;
a light path combiner which combines a light path of the first laser beam shaped by the beam shaping element and light paths of the second and third laser beams respectively emitted from the second and third semiconductor laser sources;
a polarizing beam splitter having a polarized light separation film in contact with the air, the polarizing beam splitter reflecting the first, second and third laser beams having a combined light path combined by the light path combiner on the polarized light separation film;
an objective lens which focuses the first, second and third laser beams reflected on the polarized light separation film, onto an optical information recording medium;
an optical filter which satisfies a following condition with regard to a part of a s-polarized light component of the first, second and third laser beams transmitted through the polarizing beam splitter, $$TS655 < TS405$$

where
TS405 represents a transmittance (%) of the s-polarized light component with a wavelength of 405 nm, and
TS655 represents a transmittance (%) of the s-polarized light component with a wavelength of 655 nm; and
a detector which detects an intensity of the first, second and third laser beams transmitted through the optical filter.

11. An optical pickup apparatus as claimed in claim 10, wherein the polarizing beam splitter has a plane-parallel plate and wherein the polarized light separation film is formed on one surface of the plane-parallel plate.

12. An optical pickup apparatus as claimed in claim 10, wherein the beam shaping element reduces a divergence angle in a direction along a long axis of the elliptic light intensity distribution of the first laser beam.

13. An optical pickup apparatus as claimed in claim 10, wherein main polarized light component of a laser beam incident to the polarizing beam splitter is s-polarized light, and wherein the following condition is satisfied, $$35 \leq \theta 1 \leq 65$$

where $\theta 1$ is an incidence angle (°) of a principle ray of the laser beam incident to the polarizing beam splitter.

14. An optical pickup apparatus as claimed in claim 10, wherein the light path combiner transmits either the first laser beam or the second and third laser beams, and reflects the other laser beam(s).

15. An optical pickup apparatus as claimed in claim 10, wherein a first phase shift of s-polarized light component of the first laser beam, a second phase shift of s-polarized light component of the second laser beam and a third phase shift of s-polarized light component of the third laser beam are caused due to reflection on the polarized light separation film, and wherein the first, second and third phase shifts are substantially linear in a predetermined angular range.

16. An optical pickup apparatus as claimed in claim 15, wherein, the first, second and third phase shifts are substantially linear in the angular range of ±4° of a predetermined incidence angle.

17. An optical pickup apparatus as claimed in claim 10, further comprising a coupling lens situated between the light path combiner and the second and third semiconductor laser sources, the coupling lens converting divergence angles of the second and third laser beams.

18. An optical pickup apparatus as claimed in claim 10, further comprising a detector detecting intensities of the first, second and third laser beams exiting from the light path combiner, the exiting laser beams not traveling toward the polarizing beam splitter.

19. An optical pickup apparatus comprising:
a first laser source adapted to emit a first laser beam in a wavelength band of 405 nm;
a second laser source adapted to emit a second laser beam in a wavelength band of 650 nm;

a light path combiner adapted to combine a light path of the first laser beam and a light path of the second laser beam to thereby form a combined light path;

a polarizing beam splitter including a polarized light separation film in contact with the air, the polarized light separation film adapted to reflect the combined light path;

an objective lens adapted to focus the combined light path onto an optical information recording medium;

an optical filter which satisfies a following condition with regard to a part of a s-polarized light component of the first and second laser beams transmitted through the polarizing beam splitter, $$TS655 < TS405$$

where

TS405 represents a transmittance (%) of the s-polarized light component with a wavelength of 405 nm, and TS655 represents a transmittance (%) of the s-polarized light component with a wavelength of 655 nm; and a detector adapted to detect an intensity of the first and second laser beams transmitted through the optical filter.

20. An optical pickup apparatus as claimed in claim 19, wherein the polarizing beam splitter includes a plane-parallel plate and wherein the polarized light separation film is located on one surface of the plane-parallel plate.

21. An optical pickup apparatus as claimed in claim 19, further comprising a beam shaping element adapted to shape a light intensity distribution of the first laser beam emitted from the first laser source, the beam shaping element adapted to reduce a divergence angle in a direction along a long axis of an ellipse of the first laser beam.

22. An optical pickup apparatus as claimed in claim 19, wherein a main polarized light component of a laser beam incident to the polarizing beam splitter is s-polarized light, and wherein the following condition is satisfied, $$35 \leq \theta 1 \leq 65$$

where θ1 is an incidence angle (°) of a principle ray of the laser beam incident to the polarizing beam splitter.

23. An optical pickup apparatus as claimed in claim 19, wherein the light path combiner is adapted to transmit either the first laser beam or the second laser beam, and reflect the other laser beam.

24. An optical pickup apparatus as claimed in claim 19, further comprising a detector adapted to detect intensities of the first and second laser beams exiting from the light path combiner, the exiting laser beams not traveling toward the polarizing beam splitter.

25. An optical pickup apparatus as claimed in claim 19, wherein a first phase shift of an s-polarized light component of the first laser beam and a second phase shift of an s-polarized light component of the second laser beam are caused due to reflection on the polarized light separation film, and wherein the first and second phase shifts are substantially linear in a predetermined angular range.

26. An optical pickup apparatus as claimed in claim 25, wherein, the first and second phase shifts are substantially linear in the angular range of 35 4° of a predetermined incidence angle.

27. An optical pickup apparatus as claimed in claim 19, further comprising a coupling lens situated between the second laser source and the light path combiner, the coupling lens adapted to convert a divergence angle of the second laser beam.

* * * * *

UNITED STATES PATENT AND TRADEMARK OFFICE
CERTIFICATE OF CORRECTION

PATENT NO. : 7,586,827 B2
APPLICATION NO. : 10/972970
DATED : September 8, 2009
INVENTOR(S) : Takuji Hatano et al.

It is certified that error appears in the above-identified patent and that said Letters Patent is hereby corrected as shown below:

Column 22:
Line 28, delete "35 4°" and insert -- ± 4° --.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,586,827 B2  Page 1 of 1
APPLICATION NO. : 10/972970
DATED : September 8, 2009
INVENTOR(S) : Hatano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1210 days.

Signed and Sealed this

Fourteenth Day of December, 2010

David J. Kappos
*Director of the United States Patent and Trademark Office*